(12) United States Patent
Gruenwald

(10) Patent No.: US 6,944,619 B2
(45) Date of Patent: Sep. 13, 2005

(54) SYSTEM AND METHOD FOR ORGANIZING DATA

(75) Inventor: Bjorn J. Gruenwald, Newtown, PA (US)

(73) Assignee: PriMentia, Inc., Newtown, PA (US)

(*) Notice: Subject to any disclaimer, the term of this patent is extended or adjusted under 35 U.S.C. 154(b) by 0 days.

(21) Appl. No.: 09/833,069

(22) Filed: Apr. 12, 2001

(65) Prior Publication Data

US 2002/0184211 A1 Dec. 5, 2002

(51) Int. Cl.$^7$ .............................................. G06F 17/30
(52) U.S. Cl. ........................... 707/101; 707/4; 707/3; 707/5; 707/6; 707/203
(58) Field of Search ............................. 707/1, 2, 3, 5, 707/10, 100, 101, 6, 200, 203, 102, 103, 104, 4; 709/302, 328

(56) References Cited

U.S. PATENT DOCUMENTS

| | | | |
|---|---|---|---|
| 3,775,753 A | 11/1973 | Kastner | 340/172.5 |
| 4,068,300 A | 1/1978 | Bachman | 707/1 |
| 4,281,391 A | 7/1981 | Huang | 708/491 |
| 4,414,629 A | 11/1983 | Waite | 705/28 |
| 4,779,192 A | 10/1988 | Torii et al. | 364/200 |
| 5,148,541 A | 9/1992 | Lee et al. | |
| 5,226,158 A | 7/1993 | Horn et al. | |
| 5,287,494 A | 2/1994 | Garcia et al. | |
| 5,471,612 A | 11/1995 | Schlafly | 707/503 |
| 5,499,359 A | 3/1996 | Vijaykumar | |
| 5,508,538 A | 4/1996 | Fijany et al. | |
| 5,535,300 A | 7/1996 | Hall, II et al. | 704/227 |
| 5,542,087 A | 7/1996 | Neimat et al. | 395/600 |
| 5,603,022 A | 2/1997 | Ng et al. | |
| 5,619,709 A * | 4/1997 | Caid et al. | 707/532 |

(Continued)

FOREIGN PATENT DOCUMENTS

| | | |
|---|---|---|
| WO | WO95/00896 | 1/1995 |
| WO | WO95/30981 | 11/1995 |
| WO | WO99/38093 | 7/1999 |

OTHER PUBLICATIONS

Standish, T.A., "Data Structure Techniques", 1980, XP002217996, pp. 8–11.
Standish, T.A., "Data Structure Techniques", 1980, XP002217997, p. 290.
Cormen et al., "Introduction to Algorithms", copyright 1990 by The Massachusetts Institute of Technology, Nineteenth printing, 1997 by MIT Press, pp. 1–5 and 11–15.
Cormen et al., "Introduction to Algorithms", copyright 1990 by The Massachusetts Institute of Technology, Nineteenth printing, 1997 by MIT Press, pp. 153–155.

Primary Examiner—Jean M. Corrielus
(74) Attorney, Agent, or Firm—Pillsbury Winthrop Shaw Pittman LLP

(57) ABSTRACT

A system and method for organizing and retrieving data is provided. The present invention replicates existing data in a format that is representative of naturally occurring relationships associated with the elements in the data. The data is organized into groups which represent a collection of information including one or more data fields. These groups are organized into a hierarchy based on relationships in the underlying data referred to as mappings. The hierarchy provides an organizational structure that is flexible in terms of traversing, organizing, searching, and presenting data. This organization structure is also conducive for extracting a portion of the database relevant to a particular purpose and replicating that portion elsewhere, such as on a palmtop computer, personal data apparatus ("PDA"), etc. Data is extracted from the database in a context that includes all information relevant to an item of data at a top, or parent, level of the hierarchy. The context provides a useful way for a user to analyze data within each of the various contexts in which that item of data exists.

45 Claims, 25 Drawing Sheets

U.S. PATENT DOCUMENTS

| | | | |
|---|---|---|---|
| 5,621,908 A | 4/1997 | Akaboshi et al. | |
| 5,633,998 A | 5/1997 | Schlafly | 714/1 |
| 5,668,989 A | 9/1997 | Mao | 707/101 |
| 5,703,907 A | 12/1997 | James | 375/240 |
| 5,745,896 A | 4/1998 | Vijaykumar | |
| 5,794,178 A * | 8/1998 | Caid et al. | 704/9 |
| 5,799,303 A | 8/1998 | Tsuchimura | |
| 5,806,057 A | 9/1998 | Gormley et al. | |
| 5,809,501 A | 9/1998 | Noven | |
| 5,819,268 A | 10/1998 | Hackett | |
| 5,822,743 A | 10/1998 | Gupta et al. | 706/50 |
| 5,841,981 A | 11/1998 | Kondo | |
| 5,877,482 A | 3/1999 | Reilly | 235/380 |
| 5,924,091 A | 7/1999 | Burkhard et al. | 707/7 |
| 5,926,811 A * | 7/1999 | Miller et al. | 707/5 |
| 5,970,490 A * | 10/1999 | Morgenstern | 707/10 |
| 5,974,407 A | 10/1999 | Sacks | 707/2 |
| 5,978,788 A | 11/1999 | Castelli et al. | |
| 5,983,216 A * | 11/1999 | Kirsch et al. | 707/2 |
| 5,987,456 A | 11/1999 | Ravela et al. | |
| 6,026,397 A | 2/2000 | Sheppard | 707/5 |
| 6,029,195 A | 2/2000 | Herz | |
| 6,106,562 A | 8/2000 | Teter et al. | |
| 6,108,670 A * | 8/2000 | Weida et al. | 707/203 |
| 6,154,213 A | 11/2000 | Rennison et al. | 345/356 |
| 6,175,835 B1 | 1/2001 | Shadmon | 707/102 |
| 6,185,567 B1 | 2/2001 | Ratnaraj et al. | 707/10 |
| 6,196,466 B1 | 3/2001 | Schuessler | |
| 6,208,993 B1 * | 3/2001 | Shadmon | 707/102 |
| 6,233,571 B1 | 5/2001 | Egger et al. | |
| 6,249,784 B1 | 6/2001 | Macke et al. | |
| 6,253,188 B1 | 6/2001 | Witek et al. | 705/14 |
| 6,356,936 B1 | 3/2002 | Donoho et al. | |

* cited by examiner

| COLORS | | | SHAPES | |
|---|---|---|---|---|
| 1 | PINK | 1 | STARS |
| 2 | ORANGE | 2 | HORSESHOES |
| 3 | GREEN | 3 | DIAMONDS |
| 4 | BLUE | 4 | HEARTS |
| 5 | PURPLE | 5 | CLOVERS |

| PINK | STARS |
|---|---|
| ORANGE | HORSESHOES |
| GREEN | DIAMONDS |
| BLUE | HEARTS |
| PURPLE | CLOVERS |

| PINK | HEARTS |
|---|---|
| ORANGE | STARS |
| GREEN | CLOVERS |
| BLUE | DIAMONDS |
| PURPLE | HORSESHOES |

| STARS | ORANGE |
|---|---|
| HORSESHOES | PURPLE |
| DIAMONDS | BLUE |
| HEARTS | PINK |
| CLOVERS | GREEN |

| 1 | 4 |
|---|---|
| 2 | 1 |
| 3 | 5 |
| 4 | 3 |
| 5 | 2 |

| 1 | 2 |
|---|---|
| 2 | 5 |
| 3 | 4 |
| 4 | 1 |
| 5 | 3 |

| 4 |
|---|
| 1 |
| 5 |
| 3 |
| 2 |

| 2 |
|---|
| 5 |
| 4 |
| 1 |
| 3 |

FIG. 5
One-to-One 510
Many-to-One 520
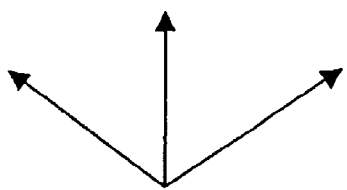
One-to-Many 530
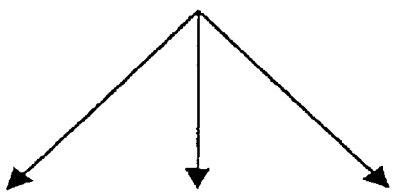
Many-to-Many 540

FIG. 6

MMX Files

| MMF | | MMR | |
|---|---|---|---|
| One to | Many | Many to | One |
| --- | --- | --- | --- |
| --- | --- | --- | --- |
| 12 | 4 | 3 | 57 * |
| --- | --- | 4 | 12 |
| --- | --- | --- | --- |
| o 24 | 151 | --- | --- |
| o 24 | 201 | 36 | 57 * |
| --- | --- | --- | --- |
| --- | --- | --- | --- |
| 43 | 212 | 91 | 119 |
| --- | --- | --- | --- |
| --- | --- | --- | --- |
| * 57 | 3 | 151 | 24 o |
| * 57 | 36 | --- | --- |
| * 57 | 200 | --- | --- |
| * 57 | 213 | 200 | 57 * |
| --- | --- | 201 | 24 o |
| --- | --- | --- | --- |
| 119 | 91 | --- | --- |
| --- | --- | 212 | 43 |
| --- | --- | 213 | 57 * |
| --- | --- | --- | --- |
| --- | --- | --- | --- |

MMX Files

| MMF | | | MMR | | |
|---|---|---|---|---|---|
| Many to Many' | | | Many' to Many | | |
| | --- | --- | | --- | --- |
| | --- | --- | | --- | --- |
| | 7 | 256 | | 21 | 8 * |
| * | 8 | 38 + | | --- | --- |
| * | 8 | 21 | | --- | --- |
| * | 8 | 312 | + | 38 | 8 * |
| | --- | --- | + | 38 | 35 |
| | --- | --- | + | 38 | 58 |
| | 19 | 317 | + | 38 | 112 o |
| | --- | --- | | --- | --- |
| | --- | --- | | --- | --- |
| | 35 | 38 + | | 70 | 36 |
| | 36 | 70 | | 71 | 112 o |
| | --- | --- | | --- | --- |
| | --- | --- | | 256 | 7 |
| | 58 | 38 + | | --- | --- |
| | --- | --- | | --- | --- |
| | --- | --- | | 312 | 8 * |
| o | 112 | 71 | | --- | --- |
| o | 112 | 38 + | | --- | --- |
| | 113 | 316 | | 316 | 113 |
| | --- | --- | | 317 | 19 |
| | --- | --- | | --- | --- |
| | | | | --- | --- |

710  720

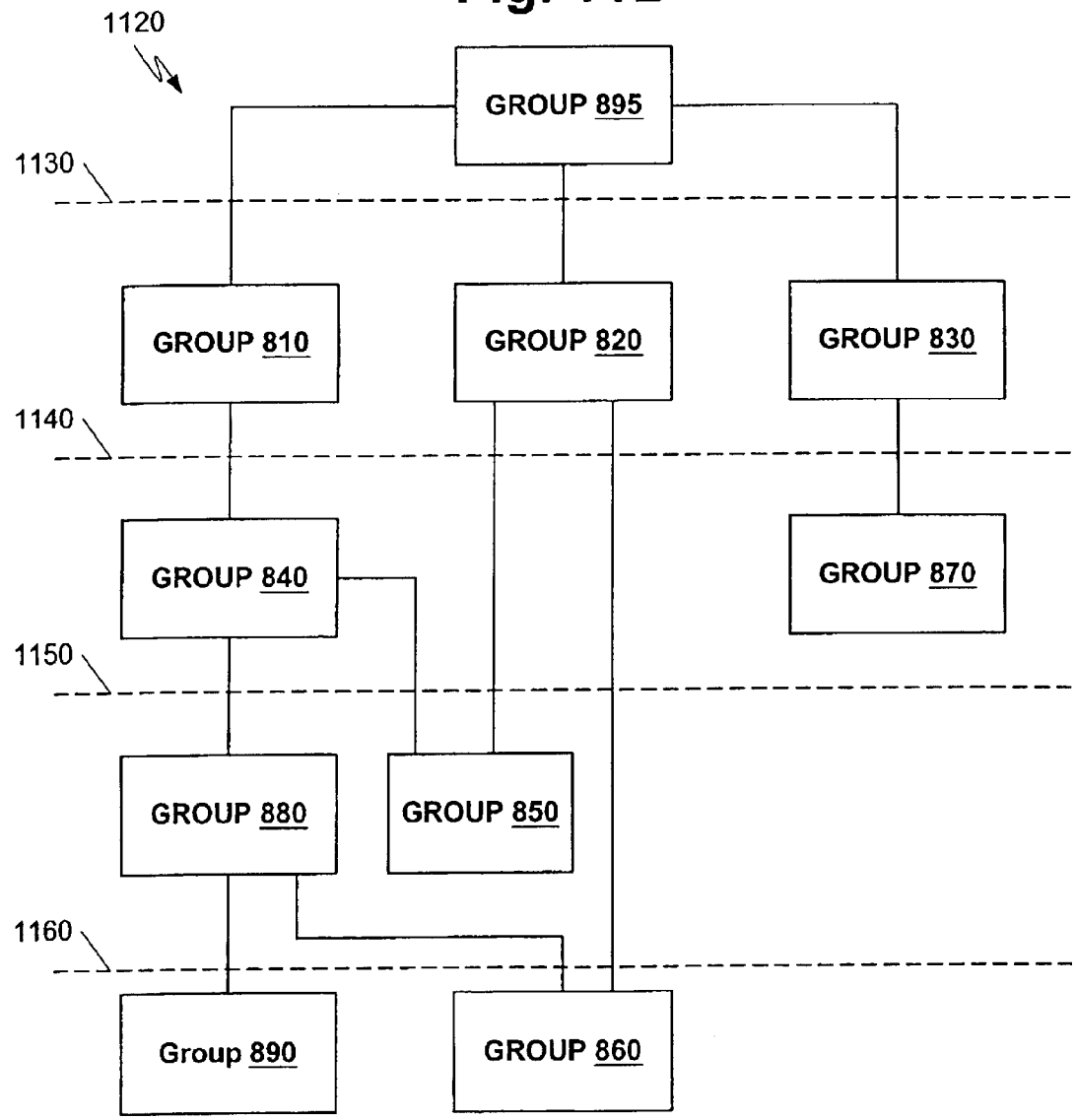

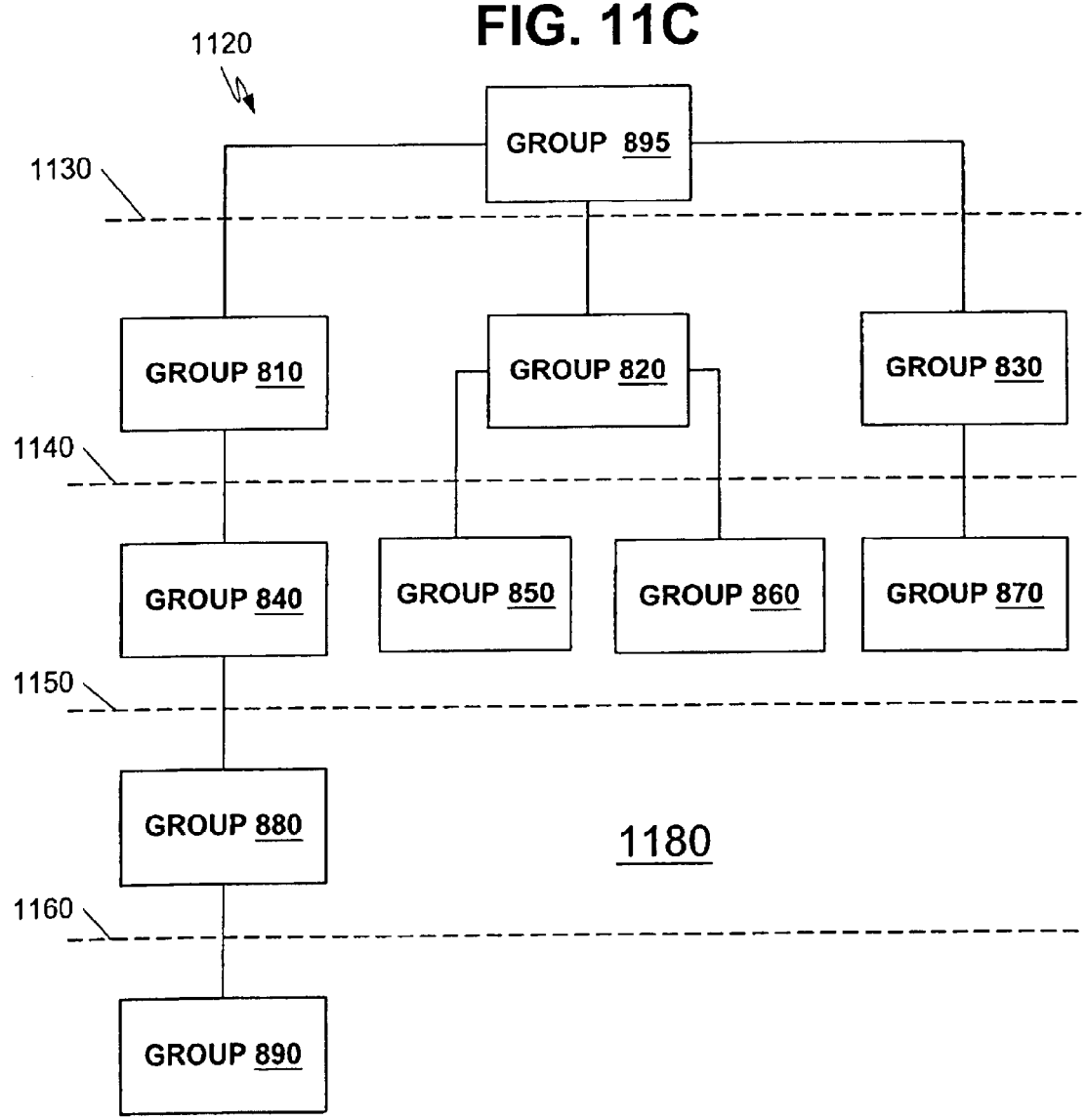

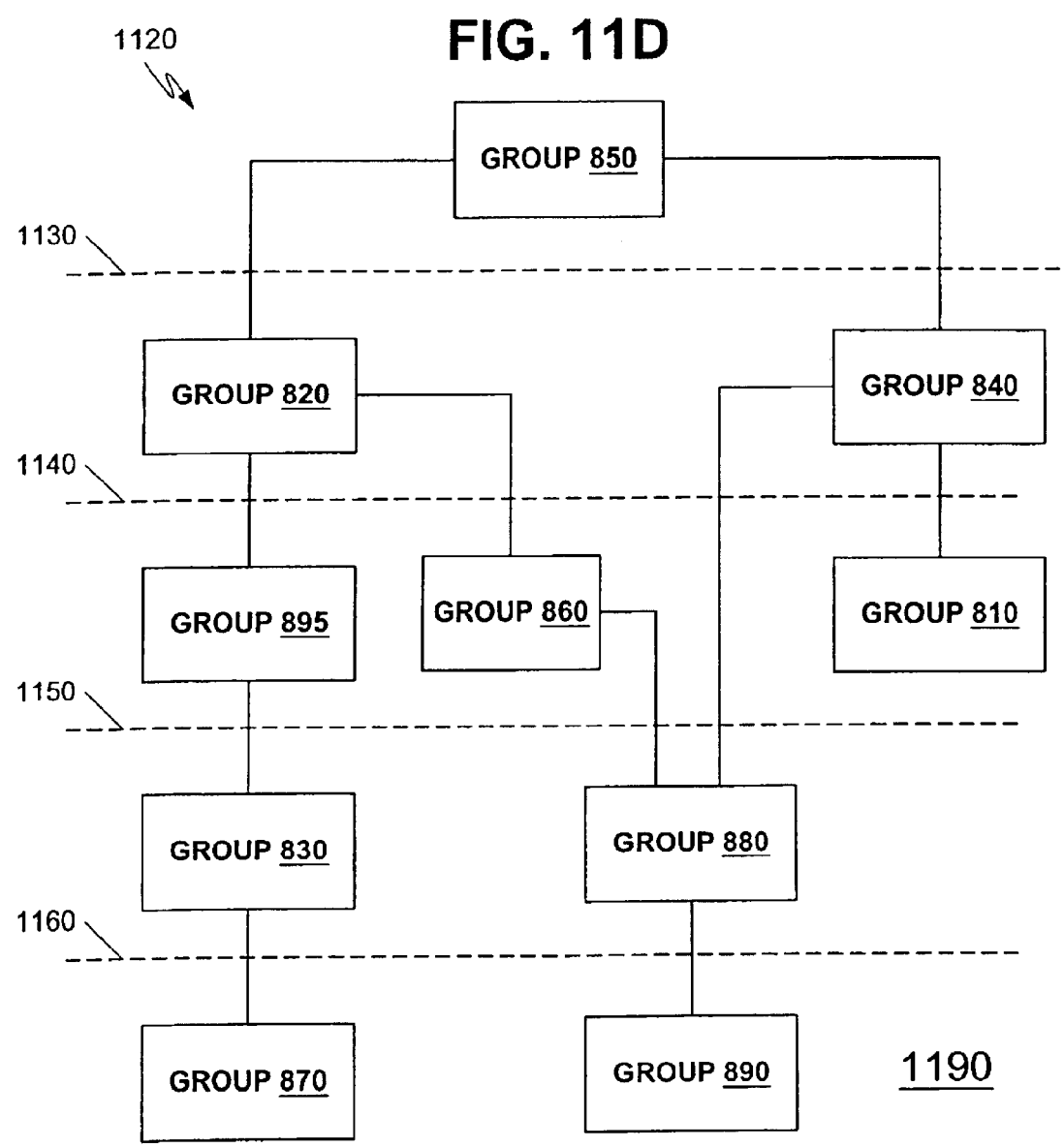

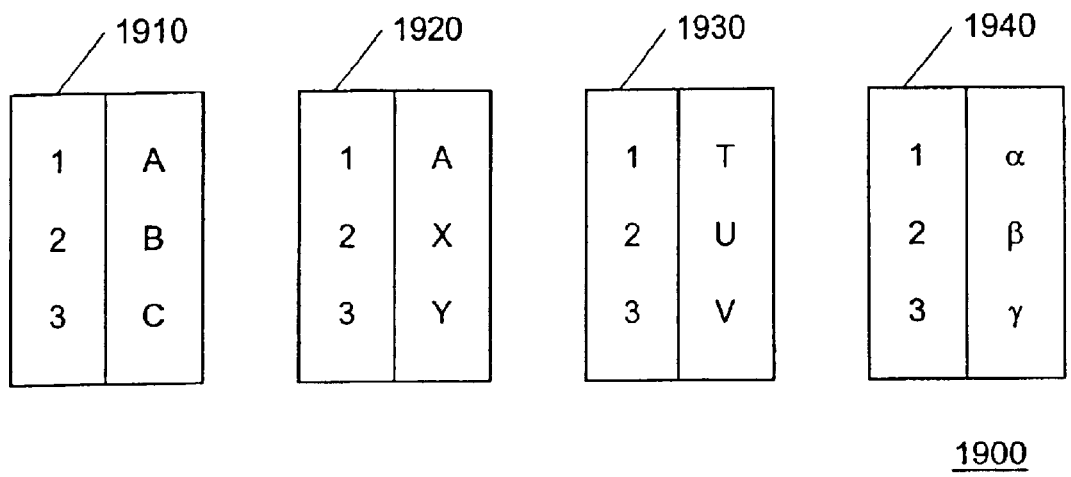
FIG. 19
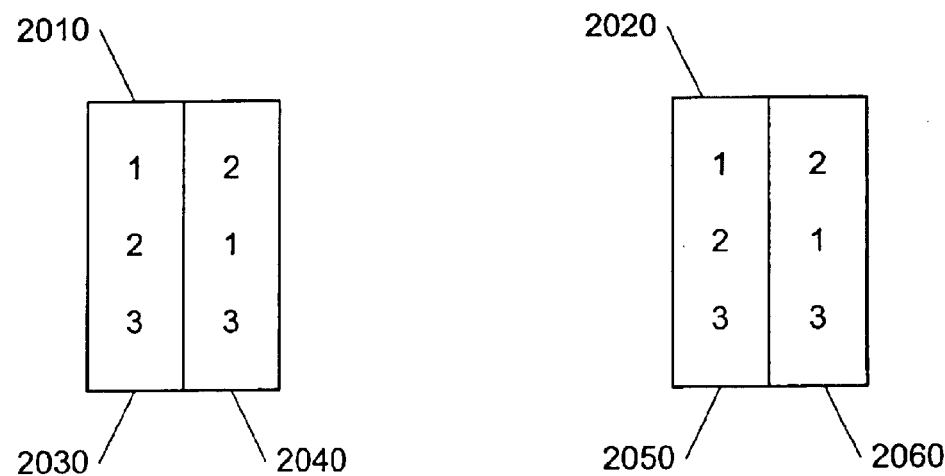
FIG. 20A  FIG. 20B

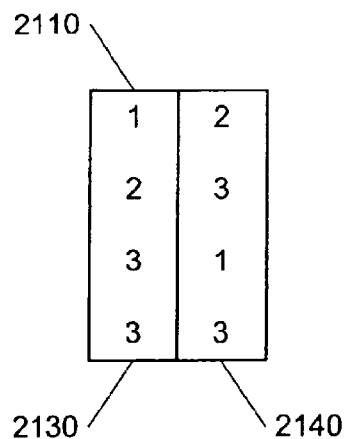
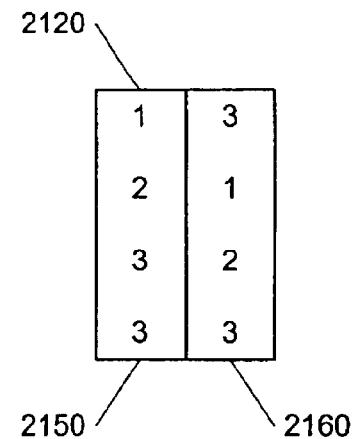
FIG. 21A  FIG. 21B
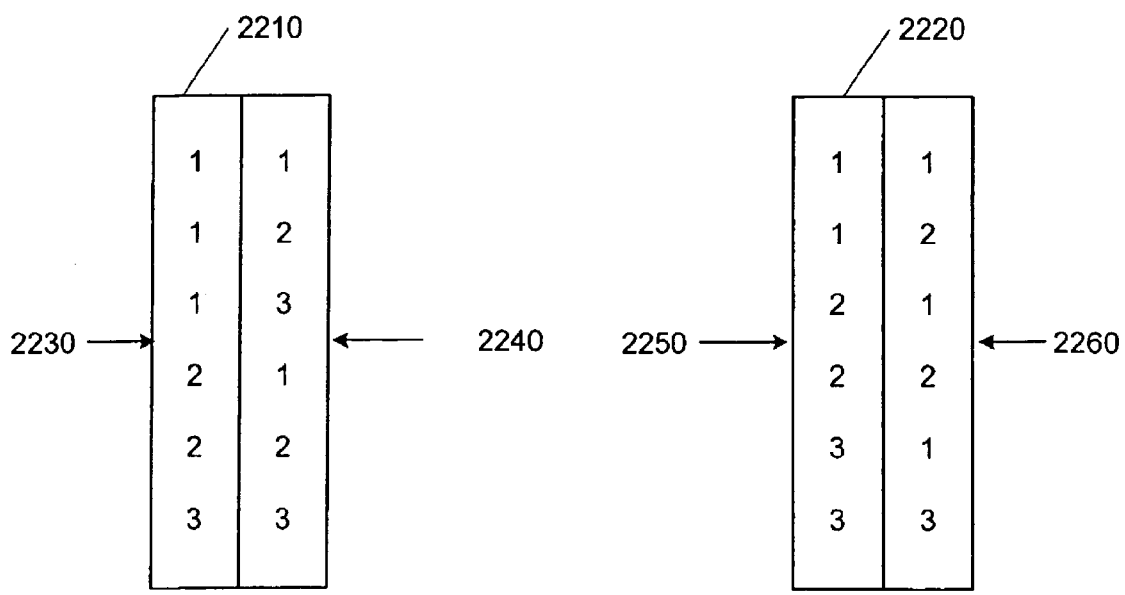
FIG. 22A  FIG. 22B

SYSTEM AND METHOD FOR ORGANIZING DATA

CROSS-REFERENCE TO RELATED APPLICATIONS

The present application is related to application Ser. No. 09/617,047, entitled "System and Method for Organizing Data," which was filed on Jul. 14, 2000, and which issued as U.S. Pat. No. 6,542,896 on Apr. 4, 2003; which is related to a application Ser. No. 09/412,970, entitled "System and Method for Organizing Data," which was filed on Oct. 6, 1999, and which issued as U.S. Pat. No. 6,457,006 on Sep. 24, 2002; which, in turn, is related to a application Ser. No. 09/357,301, entitled "System and Method for Organizing Data," which was filed on Jul. 20, 1999, and which issued as U.S. Pat. No. 6,424,969 on Jul. 23, 2002. The contents of all three of the above mentioned co-pending applications are hereby incorporated by reference.

BACKGROUND

1. Field of the Invention

The present invention relates to databases generally, and more particularly to a system and method for organizing, searching, and retrieving stored data.

2. Discussion of the Related Art

Data in conventional database systems tends to be organized in ways that constrain effective access and use of the data. Some conventional database systems organize data in an "ad hoc" fashion. Data in ad hoc databases tends to be organized with a specific purpose in mind. For example, data published on the World Wide Web is organized according to how its publisher wishes it to be viewed. Other conventional database systems organize data in relational databases. Data in relational databases is organized into tables with various connections among the tables dependant upon the nature of relationships in the underlying data stored therein. Still other conventional systems organize data in object oriented databases. These databases employ traditional object oriented mechanisms for retrieving and storing data. Various other conventional databases are described generally in *C. J. Date, Introduction to Database Systems* (Addison Wesley, $6^{th}$ ed. 1994).

Conventional techniques to search for and retrieve data are often limited by a format in which the data is stored. Not only are these techniques constrained by the format of the data, but also by an organization of that data imposed by an original implementation. Typically, a user supplies one or more search terms when performing a database query. However, a user must also understand the organization of the data in terms of fields, tables, objects, etc, in which any search terms may appear.

Although many proprietary database systems with specialized user interfaces and application programmer interfaces (APIs) exist to assist the user, various databases, particularly relational databases, are based on a structured query language (SQL) that provides additional levels of interface above SQL. A query of a relational database is constrained by a table format associated with the underlying relational database. Furthermore, even the format of the relational database itself is constrained because data must be organized in a tree format. In such a format, many potential relationships are not represented. Searching or querying databases, then becomes a specialized activity requiring familiarity with the data to be searched as well as its organizational structure.

A bigger problem, however, is that not all data is organized. For example, very little of the information available on the World Wide Web (the "Web") is structured in any fashion whatsoever. A typical method for obtaining information from the Web includes using a search engine. Search engines present results of a query in an unstructured fashion. Much of the results are out of context, often identifying a bewildering array of "matches" or "hits" with little, if any relationship to one another.

Databases are used to organize data for storage, transactions, and retrieval. Many mechanisms for achieving this make use of flat files. A flat file is a database implemented in a single file. A flat file typically uses sequential storage, making it very difficult to search.

Network and hierarchic databases have been also developed. A hierarchic database is an ordered set of groups arranged in a hierarchy, with descendant groups descending from predecessor groups, each descendant group having a single predecessor group, and a unique predecessor group on top. Network databases are generalizations of hierarchical databases. A network database is a set of groups with arbitrary links between them and no ordering among the groups. In fact, in a network database two groups can each be predecessors of each other in different links.

These two forms of databases share some common problems. The problems generally are of two types: limitations in relationships that can be modeled, and inefficiencies and complexities in manipulating data and relationships. In both network and hierarchical databases, data is replicated more than necessary and all relationships are local to a given piece of data. Further, if one wants to see how an item of data in a particular group relates to the data as a whole, numerous complex queries must be made.

The current trend in databases is toward the relational model and the object oriented model. The relational model represents data in tables, with rows corresponding to data entries and columns corresponding to data fields. Each table has a set of columns designated as a key, which identifies an element uniquely. Also, mappings between tables are implemented with foreign keys, or entries in tables that map to keys in other tables. This is a flexible representation that permits modeling of many relationships, but it is burdened by the local view it imposes of data. Often times, data is replicated unnecessarily and mappings are local to a particular relationship among a particular occurrence of data fields.

Object oriented databases exhibit the typical characteristics of object oriented programming: encapsulation, inheritance, polymorphism, etc. Often, these characteristics exist only in the interface rather than the implementation itself, and the underlying database is relational or hierarchic, for example. If the underlying database is itself object oriented, then again the representation is local in nature, data is replicated, and interdependencies among data are difficult to model or discover.

What is needed is an improved system and method for organizing data.

SUMMARY OF THE INVENTION

The present invention provides a system and method for organizing and retrieving data. The present invention replicates existing data in a format that is representative of naturally occurring relationships associated with the elements in the data. The data is organized into groups. A group represents a collection of information including one or more data fields. These groups are organized into a network based on relationships in the underlying data. These relationships are referred to herein as mappings. The network provides an organizational structure that is flexible in terms of traversing, organizing, searching, and presenting data. This organization structure is also conducive for extracting a portion of the database relevant to a particular purpose and replicating that portion elsewhere, such as on a palmtop computer, personal data apparatus ("PDA"), etc.

According to one embodiment of the present invention, the data is represented in a context format. In this embodiment, a context includes all information relevant to an item of data at a parent group of the network. The context provides a useful way for a user to analyze data within each of the various contexts in which that item of data exists.

According to another embodiment of the present invention, mappings between groups are stored in separate files, referred to herein as many-to-many transfer (MMX) files. These MMX files are used to map relationships between two groups adjacent one another in the hierarchy. In some embodiments of the present invention, these mappings are maintained in both directions for each of the groups in the network. The use of MMX files facilitates the tracking of relationships in the underlying data within the network.

One feature of the present invention provides a method for efficiently searching and retrieving data. The data is organized according to a structure, and a query can be made against any group or multiple groups of the structure. The results of the query are returned in context. In some embodiments of the present invention, the results are presented in a format that aids in quick user comprehension, selection, and traversal of the relevant data.

Another feature of some embodiments of the present invention is independence from the organization of the source(s) of the data source. These embodiments replicate the data in memory and virtual memory in a format conducive to rapid searching and retrieval in a format suitable for traversal by the user. Furthermore, changes in underlying data, such as updates to a transactional database, can be reflected readily in the replicated data.

Another feature of some embodiments of the present invention provides a way to naturally apply mathematical algorithms to data of any kind. Mathematical algorithms provide increased functionality, efficiency, and methods for classifying and presenting data. Furthermore, mathematical algorithms provide a tremendous speed increase over conventional database algorithms in performing needed functions such as a sort.

Another feature of some embodiments of the present invention allows for the application of a useful structure to data having an arbitrary number of fields with arbitrary relationships. Regardless of the complexity of the data, these embodiments of the present invention can efficiently and effectively model and manipulate relationships among the data.

Another feature of some embodiments of the present invention provides a global interpretation on data that permits a representation of both local and global relationships among data. These embodiments of the present invention facilitate complex queries and return data in a format with context and structure that is easy for a user to parse and readily extract relevant information.

Another feature of some embodiments of the present invention allows creation of a subset of a database by querying and extracting only information relevant to the query. Such a subset is useful to speed fixture queries or to place data for analysis onto a small hand-held device, for example.

These and other features and advantages of the present invention will become apparent from the following drawings and description.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIGS. 4A–4H illustrate mapping relationships between data groups according to various embodiments of the present invention.

FIG. 5 illustrates various types of mappings.

FIG. 6 illustrates exemplary many-to-many transfer ("MMX") files according to one embodiment of the present invention.

FIG. 7 illustrates exemplary MMX files according to one embodiment of the present invention.

FIGS. 11A–D illustrate various exemplary hierarchies formed from the network of groups.

FIG. 19 illustrates exemplary data files according to one embodiment of the present invention.

FIGS. 20–22 illustrate various MMX files reflective of the various relationships between the groups in the hierarchy of FIG. 18.

DETAILED DESCRIPTION

System Overview

The present invention is directed to a system and method for organizing, searching and retrieving data. The present invention is described below with respect to various exemplary embodiments, particularly with respect to various database applications. However, various features of the present invention may be extended to other areas as would be apparent.

Figure 1:
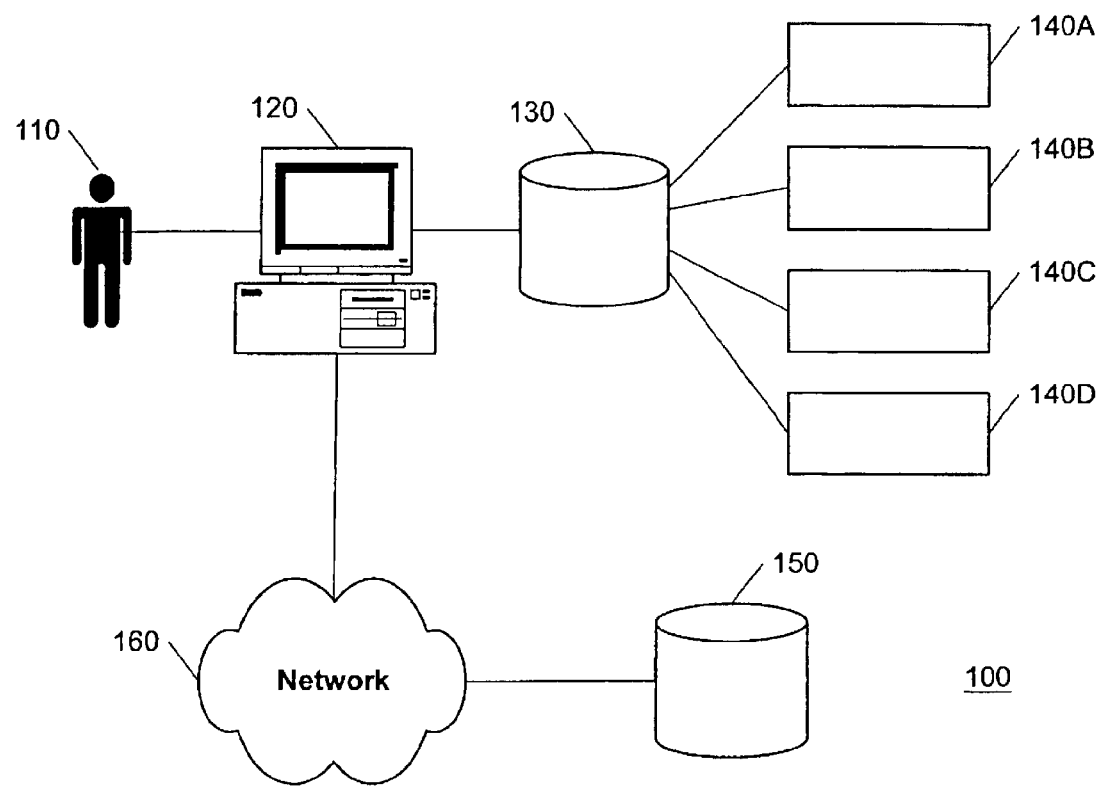
FIG. 1 illustrates an exemplary environment in which the present invention operates.

FIG. 1 illustrates an exemplary environment in which the present invention operates. Environment 100 includes a user 110 interacting with a computer 120. In various embodiments, the present invention is embodied in software, hardware, firmware or other similar structures and devices, and/or combinations thereof, operable on or with computer 120. Computer 120 may be connected through a network 160 to one or more data sources 150 that contain data. Network 160 may be an internet, such as the World Wide Web ("the Web"), an intranet, such as a company LAN or similar network, or other networks including various wired or wireless connections. Computer 120 may also be connected to a local memory 130. Local memory 130 may or may not be resident within computer 120.

In one embodiment of the present invention, data from data source 150 may be replicated and organized in local memory 130 as data structures 140 (illustrated in FIG. 1 as data structures 140A, 140B, 140C, and 140D.) An exemplary organization of data from data source 150 into data structures 140 is illustrated with respect to FIG. 2, FIGS. 3A and 3B.

Figure 2:
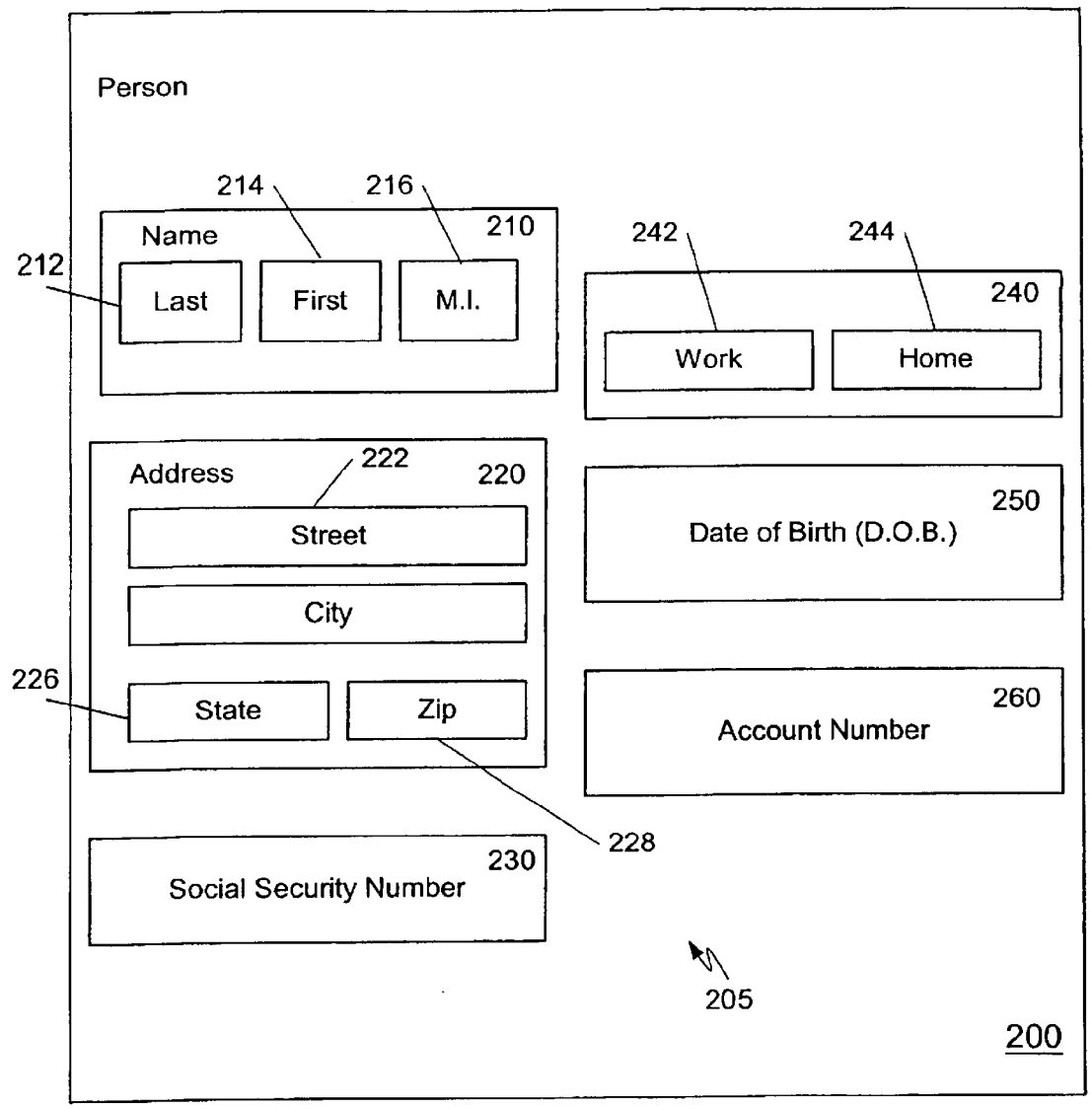
FIG. 2 illustrates an exemplary data record.
Figure 3A:
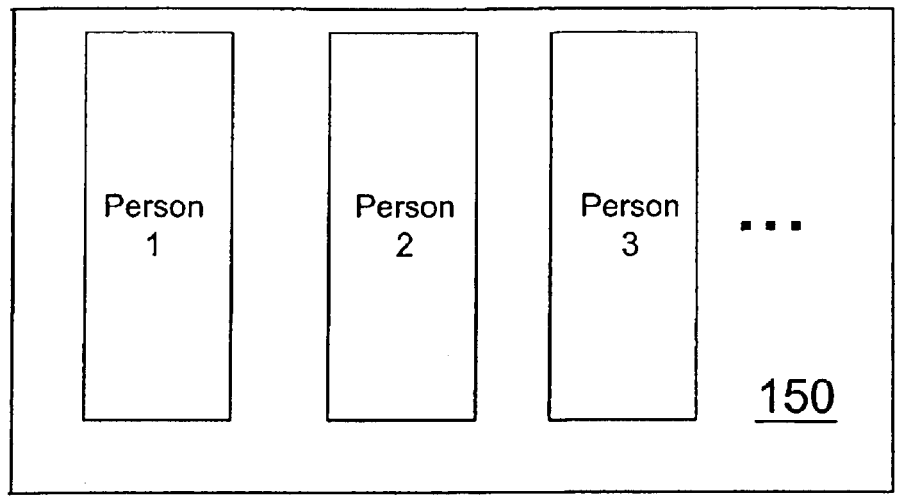
FIGS. 3A and 3B illustrate how data elements from the data records are organized according to one embodiment of the present invention.

FIG. 2 illustrates an exemplary data record 200 from data source 150. As illustrated, data record 200 includes various data fields 205, including a name 210, which may include separate data fields for a last name 212, a first name 214, and a middle initial 216; an address 220, which may include separate data fields for a street address 222, a city 224, a state 226, and a zip code 228; a social security number ("SSN") 230; a phone number 240, which may include separate data fields for a work phone number 242, and a home number 244; a date of birth ("DOB") 250; and an account number 260. Such a data record 200 may be used, for example, by banks to manage their bank accounts. Data record 200 is provided for purposes of example; the present invention operates with various other data records 200 as would be apparent.

Figure 3B:
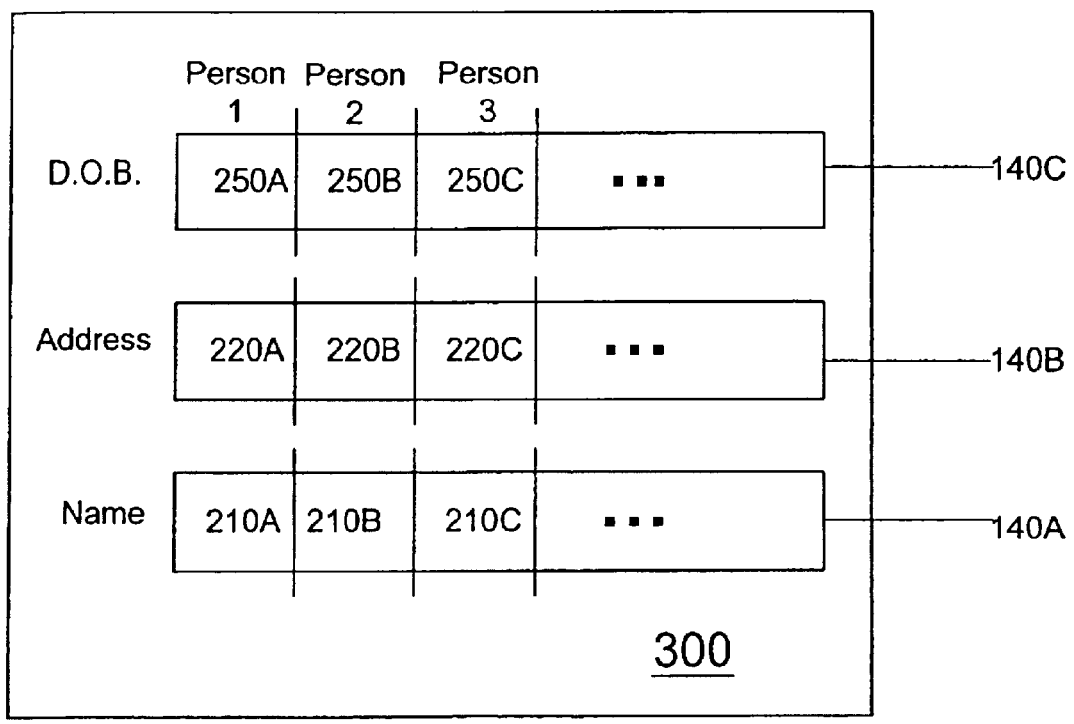

Data storage 150 may include a plurality of data records 200 as illustrated in FIG. 3. More particularly, data storage 150 may include a data record 200A for "Person 1," a data record 200B for "Person 2," a data record 200C for "Person 3," etc. In one embodiment of the present invention, individual data fields 205 from data records 200 are retrieved from data storage 150, organized as data structures 140 as illustrated in FIG. 3B, and stored in local memory 130. Henceforth, data structures 140 are referred to as data files 140. As would be apparent, data files 140 may be stored as a "file," in the traditional sense, when local memory 130 includes a hard drive, diskette, etc., or as a block, table, or array when local memory 130 includes RAM, for example. As would be apparent, in some embodiments of the present invention, disk space (e.g., diskettes, hard drives, servers, etc.) may be memory mapped and operate in a manner similar to RAM, for example.

As illustrated in FIG. 3B, according to one embodiment of the present invention, each data field 205 (e.g., DOB 250), or group of data fields (e.g., name 210) is organized as a data file 140. In particular, data file 140A corresponds to name 210 having individual name fields 210A, 210B, 210C, etc.; data file 140B corresponds to address 220 having individual address fields 220A, 220B, 220C, etc.; and data file 140C corresponds to DOB 250 having individual DOB fields 250A, 250B, 250C, etc. Each data file 140 includes all instances of the corresponding data field 205 for each data record 200. Thus, as illustrated, a name 210A from data record 200A corresponding to "Person 1" is illustrated as occupying a first line, or "column" in data file 140A; an address 220A from data record 200A is illustrated as occupying a first line in data file 140B; and a DOB 250A from data record 200A is illustrated as occupying a first line in data file 140C. In a similar fashion, data pertaining to "Person 2" and "Person 3" resides at the second and third lines, respectively, of each of data files 140A, 140B, and 140C.

In FIG. 3B, data files 140 may collectively be thought of as individual rows of a matrix while the lines (i.e., "Person X") may be thought of as its columns. Each column then corresponds to an instance of data record 200 and each row corresponds to a particular data field 205 (or group of data fields 205). The usefulness of this particular organization will become apparent and is described in detail in application Ser. No. 09/357,301, entitled "System and Method for Organizing Data," which was filed on Jul. 20, 1999, and incorporated herein by reference. As would be apparent, the "matrix" of FIG. 3B may be transposed so that columns correspond to particular data fields 205 and rows correspond to instances of data record 200.

Groups

As alluded to above, various types of data fields 205 may be organized together as a data group. FIG. 2 illustrates some examples of data groups. For example, name 210 is a data group including last name 212, first name 214, and middle initial (or name) 216. Likewise, address 220 is a data group including street address 222, city 224, state 226, and zip code 228. Other data groups may be organized in various fashions other than that illustrated, including groups of groups. For example other data groups may be organized from FIG. 2. An "identifying" data group may include name 210, SSN 230, and DOB 250, while a "person" data group may include all data fields 205 in data record 200. For purposes of the present invention, a data group is treated as a logical unit of data. In FIG. 3B, data files 140A and 140B are each a data group, specifically, name 210 and address 220. Various other relationships may exist within/among data groups in data storage 150 beyond those illustrated in FIGS. 2 and 3A–B. Before discussing those relationships in further detail, a discussion of how those relationships are tracked or "mapped" by the present invention is warranted.

Relationships

FIG. 4 illustrates an example in terms of a popular children's cereal of how the present invention maps relationships between data groups. In this cereal, marshmallows may come in one of five shapes: stars, horseshoes, diamonds, hearts, or clovers. The marshmallows also may come in one of five colors: orange, purple, blue, pink, and green. Table I illustrates the relationship between color and shape of the marshmallows.

TABLE I

| | RELATIONSHIP BETWEEN SHAPE AND COLOR | |
|---|---|---|
| 1 | Stars | Orange |
| 2 | Horseshoes | Purple |
| 3 | Diamonds | Blue |
| 4 | Hearts | Pink |
| 5 | Clovers | Green |

FIG. 4A illustrates a shape data file 410 and a color data file 420 including each of their respective values. FIG. 4B illustrates a relationship 430 between shape data file 410 and color data file 420 as defined in Table 1: hearts are pink; stars are orange; etc. In this example, the mapping is "symmetric," i.e., there is a one-to-one relationship between color and shape, and vice versa. The present invention also operates with asymmetric mappings as will be discussed in further detail below.

FIG. 4C illustrates a color-to-shape mapping 440 that maps color to shape and FIG. 4D illustrates a shape-to-color mapping 450 that maps shape to color. In one embodiment of the present invention, a left-hand column of mappings 440, 450 is sorted based on an original ordering or sort of data files 410, 420 respectively. Other bases for sorting are available as would be apparent.

In one embodiment of the present invention where only one-to-one mappings exist, mappings 440, 450 illustrated in FIGS. 4C and 4D are represented based on a position or line within the chart as opposed to the "value" of the corresponding shape or color. Thus, FIG. 4E illustrates a color-to-shape mapping 460 according to this embodiment. As illustrated, in color-to-shape mapping 460, "Line 1" in color data file 410 maps to "Line 4" in shape data file 420; "Line 2" in color data file 410 maps to "Line 1" in shape data file 420; "Line 3" in color data file 410 maps to "Line 5" in shape data file 420; "Line 4" in color data file 410 maps to "Line 3" in shape data file 420; and "Line 5" in color data file 410 maps to "Line 2" in shape data file 420. Similarly, FIG. 4F illustrates a shape-to-color data file 470 according to this embodiment. As illustrated, in shape-to-color mapping 470, "Line 1" in shape data file 420 maps to "Line 2" in color data file 410; "Line 2" in shape data file 420 maps to "Line 5" in color data file 410; "Line 3" in shape data file 420 maps to "Line 4" in color data file 410; "Line 4" in shape data file 420 maps to "Line 1" in color data file 410; and "Line 5" in shape data file 420 maps to "Line 3" in color data file 410.

In another embodiment of the present invention, mappings 460, 470 may be further simplified by taking advantage of an implicit line number of mapping 460, 470 to eliminate the left-hand column altogether as illustrated in FIGS. 4G and 4H, respectively. In other words, the implicit line (i.e., index) into color data file 410 to a particular color may also be used as the line to mapping 460. For example, the color value "Green" corresponds to "Line 3" in color data file 410. Using this as an index to mapping 480 returns "Line 5" which in turn becomes the line or index to shape data file 420 and returns a value of "Clovers." Thus, in mapping 480 illustrated by FIG. 4G, the implicit "Line 1" of color data file 410 maps to "Line 4" of shape data file 420, etc., while in mapping 490 illustrated by FIG. 4H, the implicit "Line 1" of shape data file 420 maps to "Line 2" of color data file 410, etc.

The symmetric mappings illustrated in FIG. 4 are referred to herein as one-to-one mappings because each shape maps to a unique color, and vice versa. FIG. 5 illustrates various types of symmetric mappings generally, including a one-to-one mapping 510, a one-to-many mapping 520, a many-to-one mapping 530, and a many-to-many mapping 540. As discussed, in one-to-one mapping 510, a single instance of one data group maps to a single instance in another data group. In one-to-many mapping 520, a single instance of one data group maps to a plurality of instances in another data group. In many-to-one mapping 530, a plurality of instances of one data group each map to a single instance of another data group. In many-to-many mapping 540, a plurality of instances of one data group each map to a plurality of instances of another data group. Many-to-many mapping 540 is the most general mapping, with each other mapping 510, 520, and 530 being a special case thereof. The present invention accommodates each of these types of mappings as it organizes data from data storage 150.

MMX Files

In one embodiment of the present invention, mappings may be organized and stored as a many-to-many transfer ("MMX") file. In one embodiment, each MMX file includes two columns. In some embodiments of the present invention, a left-hand column may be sorted in some manner as will be discussed in further detail below. These embodiments are sometimes referred to as "discrete" MMX files. In some embodiments of the present invention, certain mappings may be represented as continuous functions. In other words, with respect to these continuous MMX files, an equation, (e.g., y=f(x)) may be used to express the relationships.

While other mechanisms for organizing, storing and exploiting relationship information may be used as would be apparent, the present invention is now described with reference to discrete MMX files. The values within the MMX file correspond to "lines" indexed to data files 140, as discussed above, which in turn, identify data elements or instances of the related group. According to the present invention, two types of MMX files exist: a many-to-many forward transfer ("MMF") file and a many-to-many reverse transfer ("MMR") file. The MMF file maps instances from a first group to instances of a second group, while the MMR file maps from instances from the second group to instances of the first group. For now, MMF and MMR files are distinguished by definition only, as forward and reverse are relative concepts.

As illustrated in FIG. 4, mapping 460 is an MMF file that specifies the relationship between color data file 410 and shape data file 420 and mapping 470 is a MMR file that specifies the relationship between shape data file 420 and color data file 410. As mentioned above, mappings 460, 470 are symmetric. Accordingly, the MMF and MMR files are inverses of each other. As a result, reversing the columns and then sorting the new left-hand column inverts the MMX file into the MMR file, and vice versa. With respect to other types of mappings illustrated in FIG. 5, inverting a one-to-many file returns a many-to-one file and vice versa, and inverting a many-to-many file returns another many-to-many file.

FIG. 6 illustrates a set of MMX files including an MMF file 610 and an MMR file 620. As illustrated, MMF file 610 represents a one-to-many mapping. At least one data element from a first group (left-hand column of MMF file 610) maps to multiple data elements from a second group (right-hand column of MMF file 610). Specifically, line 24 of the first group maps to lines 151 and 201 of the second group; and line 57 of the first group maps to lines 3, 36, 200 and 213 of the second group. These are identified with 'o' and '*' in MMF file 610 of FIG. 6, respectively.

MMR file 620 is the inverse mapping of MMF file 610. As discussed above, MMR file 620 may be obtained by reversing the columns of MMF file 610 and sorting the new left-hand column. As MMF file 610 is a one-to-many mapping, MMR file 620 is a many-to-one mapping. Specifically, lines 151 and 201 of the second group (left-hand column of MMR file 620) each map to line 24 of the first group (right-hand column of MMR file 620). This is identified with 'o' in MMR file 620 of FIG. 6.

FIG. 7 illustrates another set of MMX files including an MMF file 710 and an MMR file 720. As illustrated, MMF file 710 represents a many-to-many mapping. Data elements from a first group (left-hand column of MMF file 710) each map to multiple data elements from a second group (right-hand column of MMF file 710). Specifically, line 8 from the first group maps to lines 38, 21, and 312 from the second group; and line 112 from the first group maps to lines 71, 38, and 316 from he second group. These are identified with '*' and 'o' in MMF file 710 of FIG. 7, respectively. MMR file 720 is also a many-to-many mapping. Specifically, line 38 from the second group (left-hand column of MMR file 720) maps to lines 8, 35, 58, and 122 from the first group (right-hand column of MMR file 720). This is identified with '+' in MMR file 720.

Networks and Hierarchies

Figure 8:
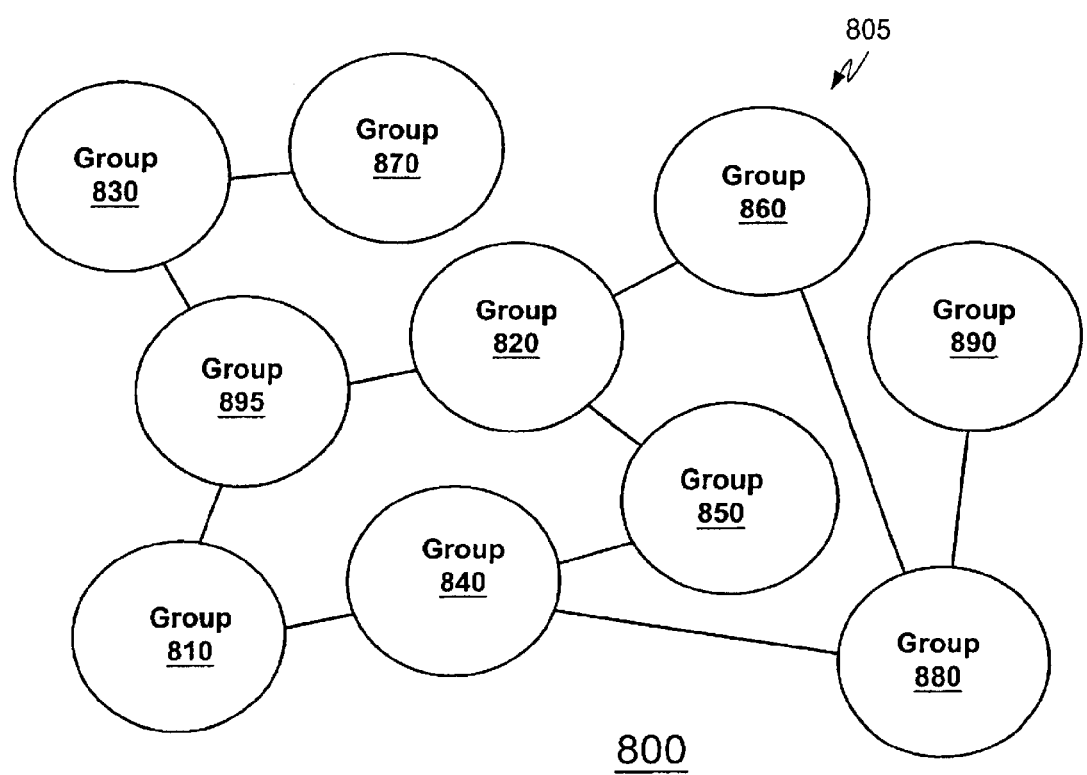
FIG. 8 illustrates an exemplary network of groups according to one embodiment of the present invention.

Many sets of relationships exist within the data in data storage 150. The present invention provides a mechanism whereby each of these relationships may mapped and subsequently exploited to search and retrieve data. Once the data is organized into groups and the relationships among the groups are mapped using, for example, MMX files, a network is formed such as network 800 illustrated in FIG. 8.

Network 800 includes various groups 805 including a group 810, a group 820, a group 830, a group 840, a group 850, a group 860, a group 870, a group 880, a group 890, and a group 895. As illustrated group 870 is mapped to group 830 with an appropriate set of MMX files; group 830 is mapped to group 870 and also to group 895 with appropriate sets of MMX files; group 895 is mapped to groups 830, 820 and 810 with appropriate sets of MMX files; etc.

In order to be useful as a whole, each group 805 in network 800 must be connected to at least one other group 805, in which case, a path exists from any one group to any other group. This path may include one or more other groups. For example, a path exists between group 870 and group 895 through group 830. As illustrated, network 800 only includes symmetric links as discussed above.

Figure 9:
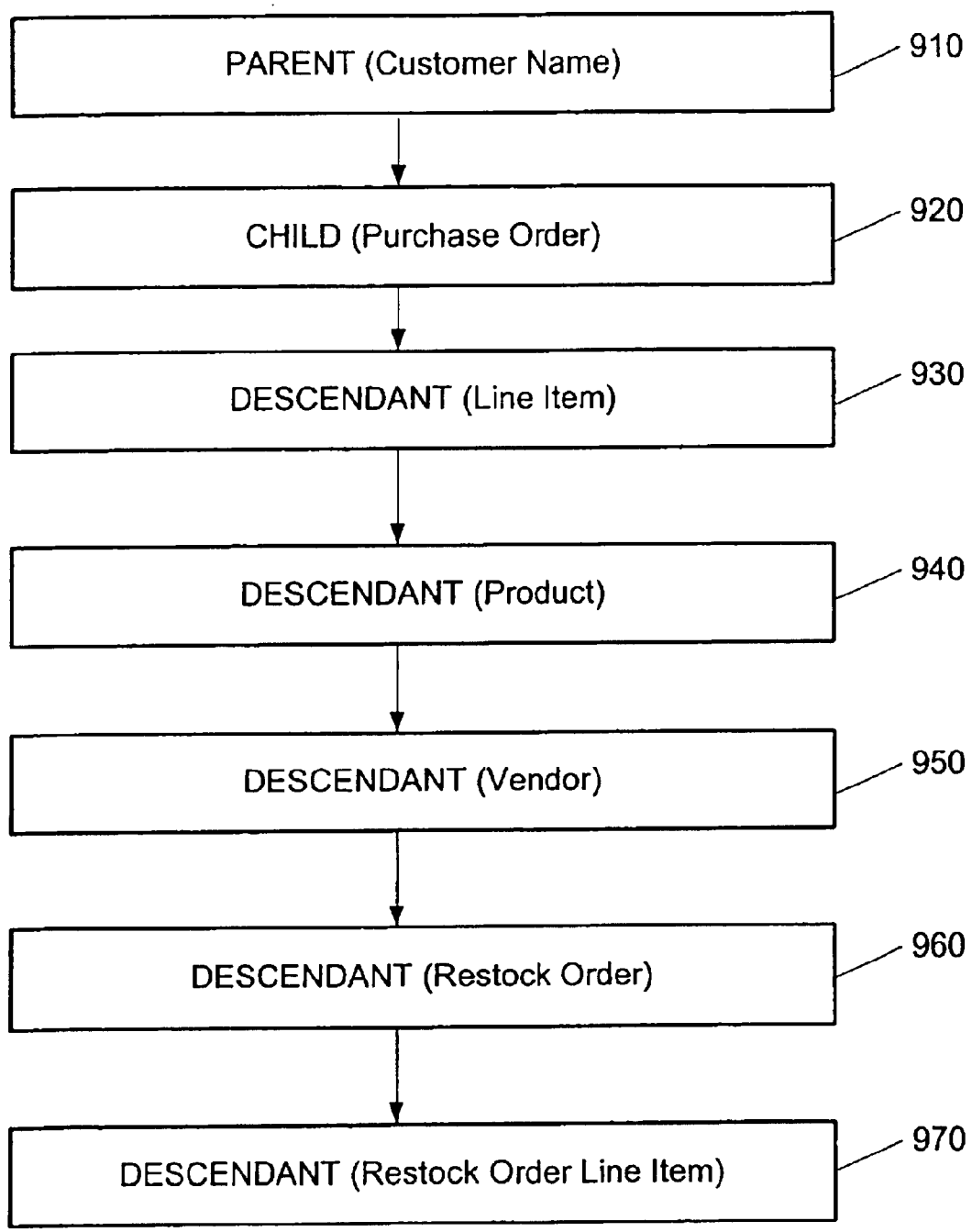
FIG. 9 illustrates an exemplary hierarchy formed from a network of groups according to one embodiment of the present invention.

Network 800 is useful for searching for and traversing data. However, the present invention may be augmented by organizing network 800 into a hierarchy. In one embodiment of the present invention, once network 800 is formed, a hierarchy, such as hierarchy 900 illustrated in FIG. 9, may be formed.

Hierarchy 900 includes a parent 910, a child 920, and any number of further descendants including a descendant 930, a descendant 940, a descendant 950, a descendant 960, and a descendant 970. In hierarchy 900, child 920 descends from parent 910; descendent 930 descends from child 920; descendant 940 descends from descend 930; etc. In general, hierarchy 900 represents relationships between groups 805 of network 800 at various levels. In hierarchy 900, a unique parent 910 exists at the top, followed by one or more "children" 920, each of which are followed by one or more "grandchildren" (e.g. descendants 930). For ease of description, any group below parent 910 is referred to as a "descendant." Also, at any level within hierarchy, a first group immediately above a second group is a "predecessor to" the second group, and the second group is a "descendant of" the first group. A link between a predecessor group and a descendant group is representative of a mapping between the groups. Thus, hierarchy 900 organizes data as levels of groups 805 and links defining relationships between groups 805.

Figure 10A:
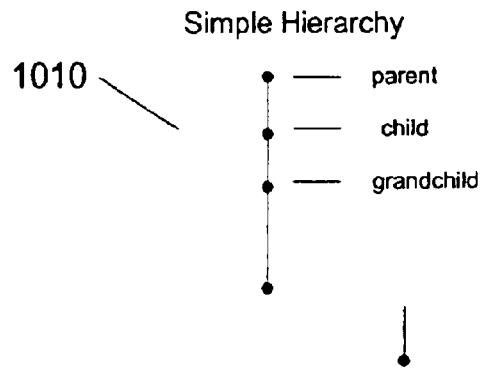
FIGS. 10A–D illustrate various types of hierarchies according to the present invention.
Figure 10B:
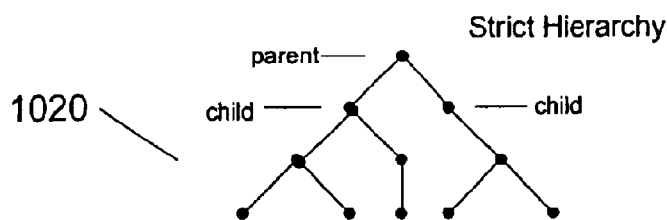
Figure 10C:
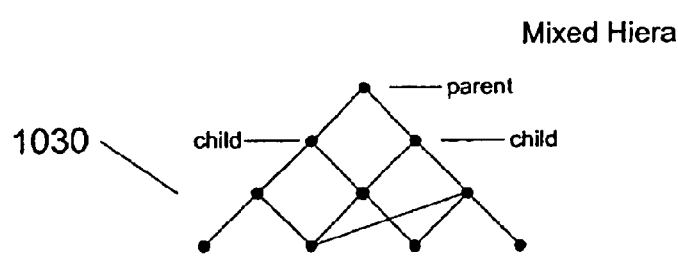
Figure 10D:
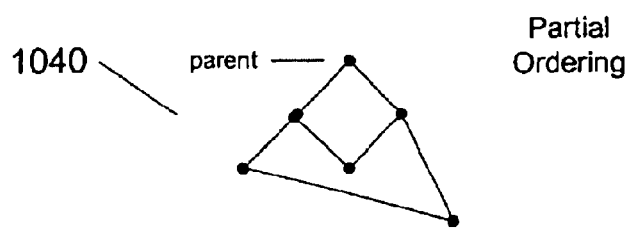

The present invention may utilize various types of hierarchies 900 such as those illustrated in FIGS. 10A–10D. FIG. 10A illustrates a simple hierarchy 1010 having one group at each level and a single link between groups on adjacent levels. FIG. 10B illustrates a strict hierarchy 1020 having at least one level with multiple groups. In strict hierarchy 1020, a unique path exists from each predecessor group back to the parent group. FIG. 10C illustrates a mixed hierarchy 1030 also having at least one level with multiple groups. In mixed hierarchy 1030, many paths may exist from each predecessor group back to the parent group. FIG. 10D illustrates a partially ordered hierarchy 1040 also having at least one level with multiple groups. Partially ordered hierarchy 1040 also may include one or more links between non-adjacent levels. In other words, in partially ordered hierarchy 1040, a descendant group may have two predecessors that reside at different levels from one another. In the other types of hierarchies 1010, 1020, 1030, each predecessor-descendant pair exists at adjacent levels in the hierarchy. Partially ordered hierarchy 1040 represents the most general relationship among the groups.

Figure 11A:
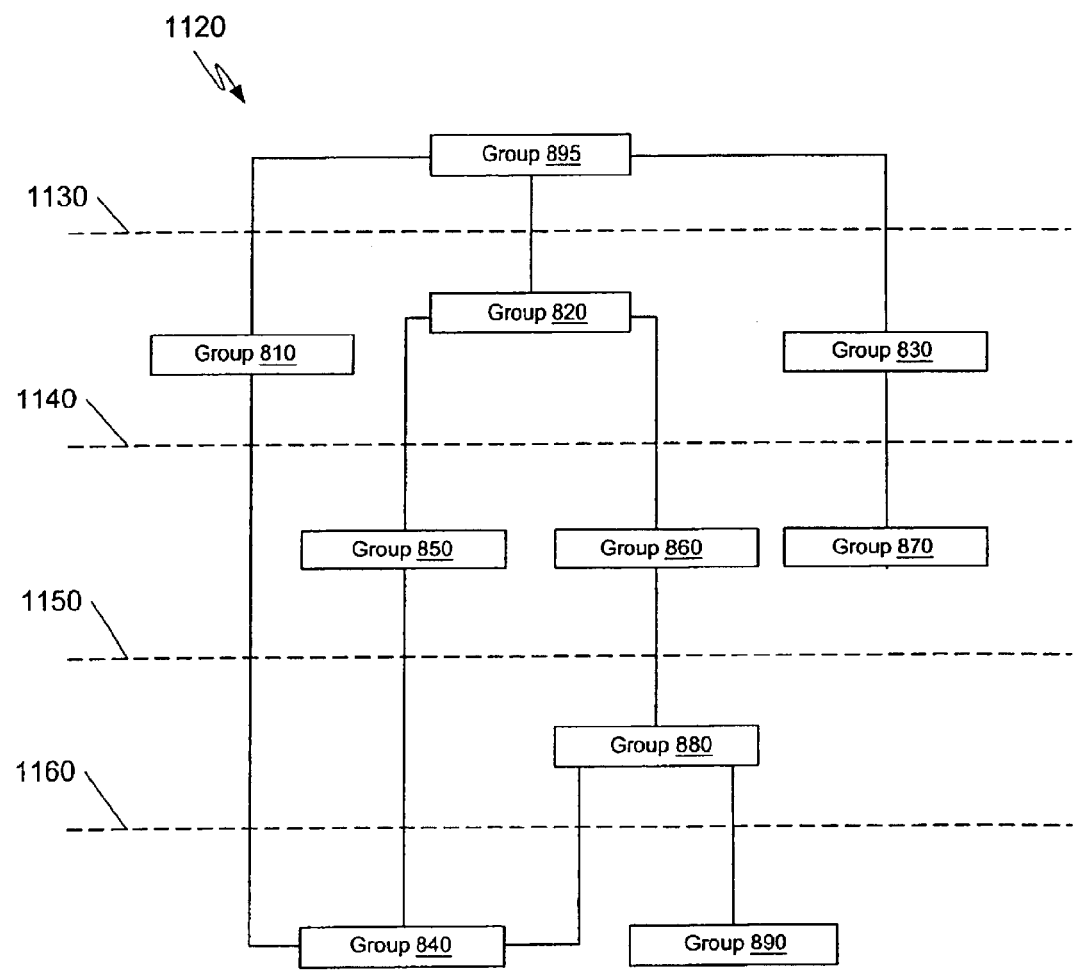

Reference is now made to FIGS. 11A–11D to discuss forming network 800 into a hierarchy. FIG. 11A illustrates a hierarchy 1110 that may be formed from network 800. In hierarchy 1110, each of groups 805 is located at various levels including a first level 1120, a second level 1130, a third level 1140, a fourth level 1150, and a fifth level 1160. Specifically, group 895 is located at first level 1120; groups 810, 820 and 830 are located at second level 1130; groups 850, 860, and 870 are located at third level 1140; group 880 is located at fourth level 1150; and groups 840 and 890 are located at fifth level 1160. Each of the mappings from network 800 is included as links between the various levels. In FIG. 11A, group 895 is selected as parent group 910; groups 810, 820, and 830 descend therefrom; etc.

FIG. 11B illustrates another hierarchy 1170 formed from network 800. In hierarchy 1170, group 895 is again selected as parent group 910, but the hierarchical structure underneath is different. Again, each of the mappings from network 800 is included as links between the various levels in hierarchy 1170. However, some of groups 805 have been organized at different levels from those in hierarchy 1110.

FIG. 11C illustrates another hierarchy 1180 formed from network 800. Hierarchy 1180 is an example of strict hierarchy 1020 because only one path exists from any group to the parent group. In hierarchy 1180, at least one of the mappings in network 800 has been removed. This may be desired in some embodiments where exploitation of some relationships may not be useful or required. While not illustrated, in some embodiments of the present invention, hierarchy 1180 may not include one or more groups 805 from network 800 for similar reasons. In addition, some of groups 805 have been organized at different levels from those in hierarchies 1110 and 1170.

FIG. 11D illustrates yet another hierarchy 1190 formed from network 800. In hierarchy 1190, a group other than group 895 is selected at parent group 910. Specifically, group 850 is selected as parent group 910.

As illustrated in FIG. 11A–11D, groups 805 may be located at different levels within the hierarchy. For example, in hierarchy 1110, group 850 is a predecessor to group 840, whereas in hierarchy 1170, group 850 is a descendant of group 840. As discussed above, because MMF files and MMR files are relative to another, they may be readily used to map the relationships between groups 805 in network 800. Then, regardless of the hierarchy selected, the respective MMF files and MMR files may be easily inverted, as necessary, to properly reflect any selected predecessor-descendant or other direction-based relationships.

The present invention utilizes the hierarchies just described to organize, search, present, and retrieve data efficiently and rapidly. The hierarchies and relationship embodied in, for example, the MMX files form a flexible and adaptable way to organize data according to natural relationships. As discussed, a given set of groups 805 may be used to build multiple hierarchies by changing the level assigned to each group and/or exploiting the relationship between the groups. Thus, the organization of the groups within the hierarchies is somewhat arbitrary. For that matter, in many embodiments, organizing the groups of network 800 into any form of hierarchy may be unnecessary.

Regardless of whether the groups are organized into a hierarchy, one factor in organizing network is which group is selected as the parent or determinant group, the unique group at the apex or center of the network. In some embodiments of the present invention, the parent group may be selected somewhat arbitrarily. In other embodiments, the parent group may be selected as the most independent of the groups in the hierarchy. In other words, the parent group is selected as the group with the least number of dependencies to other groups in the hierarchy. In still other embodiments, the parent group is selected as being causal to the other groups in the hierarchy. In these embodiments, the parent groups "causes" or "initiates" the information within the hierarchy—without this causal group, no information would exist (or be relevant). In yet other embodiments, no clear parent group exists. However, the network still imposes a useful order and structure for the information in the database and the relationships that exist therein.

Composite Mappings

Figure 12:
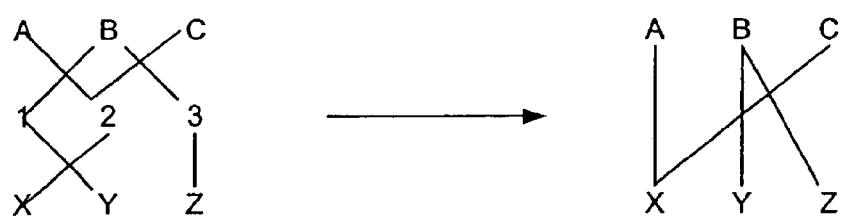
FIG. 12 illustrates an exemplary composite mapping according to one embodiment of the present invention.

A composite mapping defines a mapping between a first group and a third group via a second group. In other words, if a mapping is defined between the first group and the second group, and another mapping is defined between the second group and the third group, a composite mapping may be created between the first group and the third group. FIG. 12 illustrates this process graphically. Specifically, as illustrated therein, group A is mapped to group X through group 2; group B is mapped to group Y through group 1 and to group Z through group 3; and group C is mapped to group X through group 2. In this manner, composite mappings may be created that define mappings directly between group A and group X, between group B and groups Y and Z, and between group C and group X.

In the context of network 800, composite mappings may be exploited to create a direct mapping between group 870 and 820. This may be achieved by creating, in series, the mappings along a path from group 870 to group 820. For example, this path may comprise group 870 to group 830, group 830 to group 895, and group 895 to 820. Alternately, this path may comprise group 870 to group 830, group 830 to group 895, group 895 to group 810, group 810 to group 840, group 840 to group 850, and group 850 to group 820.

Thus, by extending this example, as long as groups 805 in network 800 are connected to at least one other group, composite mappings may be used to turn network 800 into an interconnected network. In other words, each group 805 may have a direct mapping to any other group 805 in network. As a result, any arbitrary hierarchy may be formed from network 800 by creating all possible mappings and selecting which mappings to keep and which to ignore.

Contexts

According to the present invention, a context is a collection of information represented by an instance of a first group as well as all instances of any groups in the network that are related to the instance of the first group. In a hierarchical implementation, the context is a collection of information represented by an instance of a predecessor group as well as all instances of any groups in the hierarchy that descend from the instance of the predecessor group. A determinant context is one in which the first group (or predecessor group) corresponds to a parent group in the network (hierarchy). In other words, the determinant context specifies the instances of any group that can be mapped up through the network to the instance(s) of the parent group. A context may be constructed from a parent group incrementally using relationship information such as that stored according to some embodiments of the present invention in MMX files.

Figure 13:
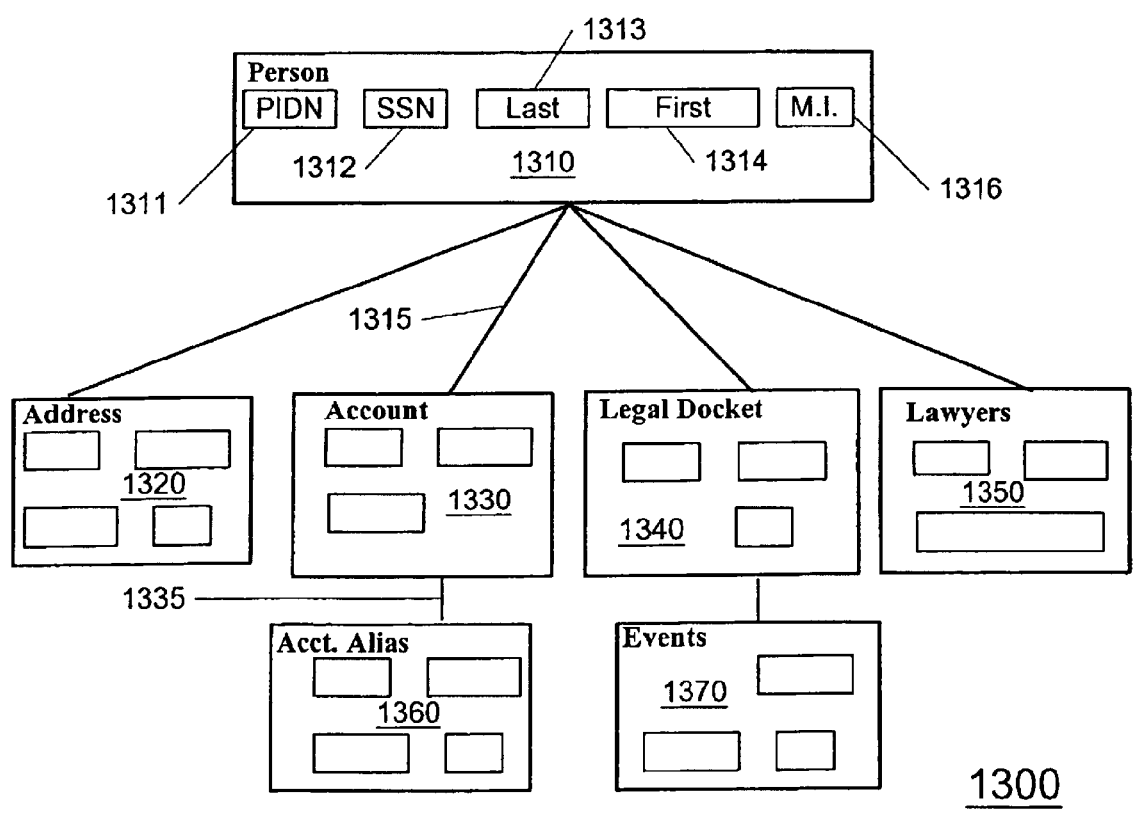
FIG. 13 illustrates an exemplary hierarchy according to one embodiment of the present invention.

The present invention is now described in terms of network 800 organized in a hierarchical fashion; however, this description applies equally to a general network 800 as will be appreciated. FIG. 13 illustrates a hierarchy 1300 for a database including information about debts owned by a company and collection actions associated with those debts. A simple context is now illustrated by considering a subset of hierarchy 1300 including a person group 1310, an account group 1330, and an account alias group 1360. As illustrated, parent group 1310 includes various data fields including a personal identification number "PIDN" 1311, a social security number "SSN" 1312, a last name 1313, a first name 1314, and a middle initial 1316. Other groups may include one or more other data fields illustrated but not otherwise described.

An MMX file 1315 (illustrated in FIG. 13 as a line connecting person group 1310 with account group 1330) and maps relationships between instances of parent group 1310 and instances of account group 1330. Likewise an MMX file 1335 (illustrated in FIG. 13 as a line connecting account group 1330 with account alias group 1360) maps relationships between instances of account group 1330 and instances of account alias group 1360.

Figure 14:
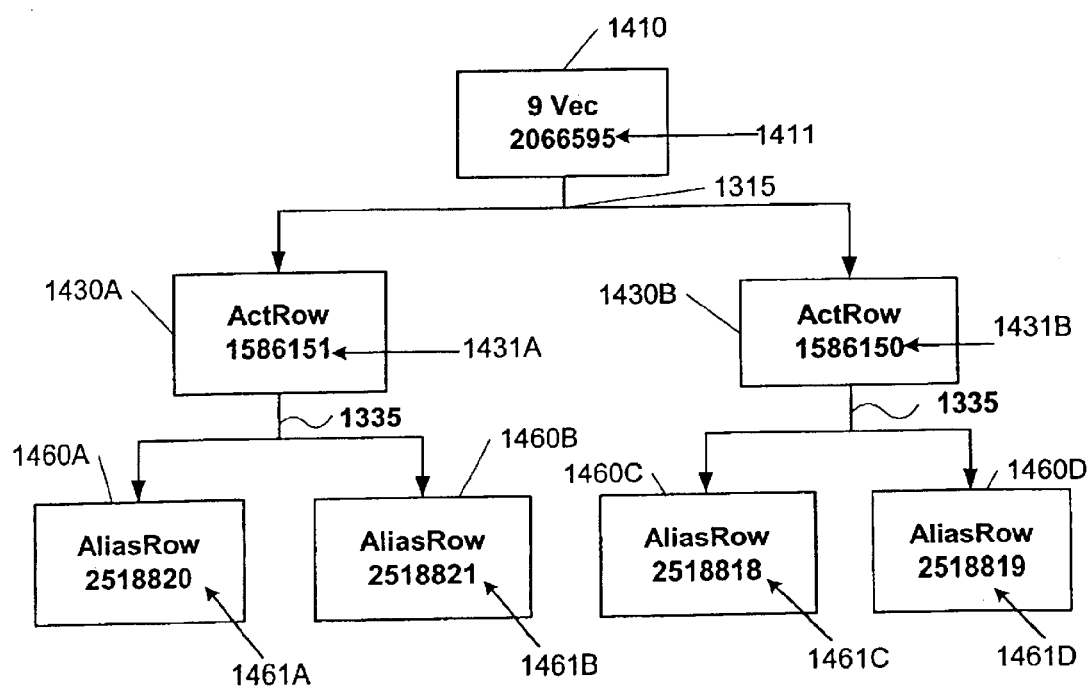
FIG. 14 illustrates an exemplary instance of a person and a portion of its context obtained from the exemplary hierarchy.

FIG. 14 illustrates a particular instance, or person 1410, of person group 1310. This instance corresponds to a set of data elements from data storage 150 as organized according to one embodiment of the present invention. In this embodiment, person 1410 represents a line 1411 into person group 1310 (and its associated data files not otherwise illustrated). As illustrated, for person 1410, line 1411 has a value of "2066595" which, as discussed above, acts as an index, pointer or other identifying indicia to the associated data files.

Figure 15:
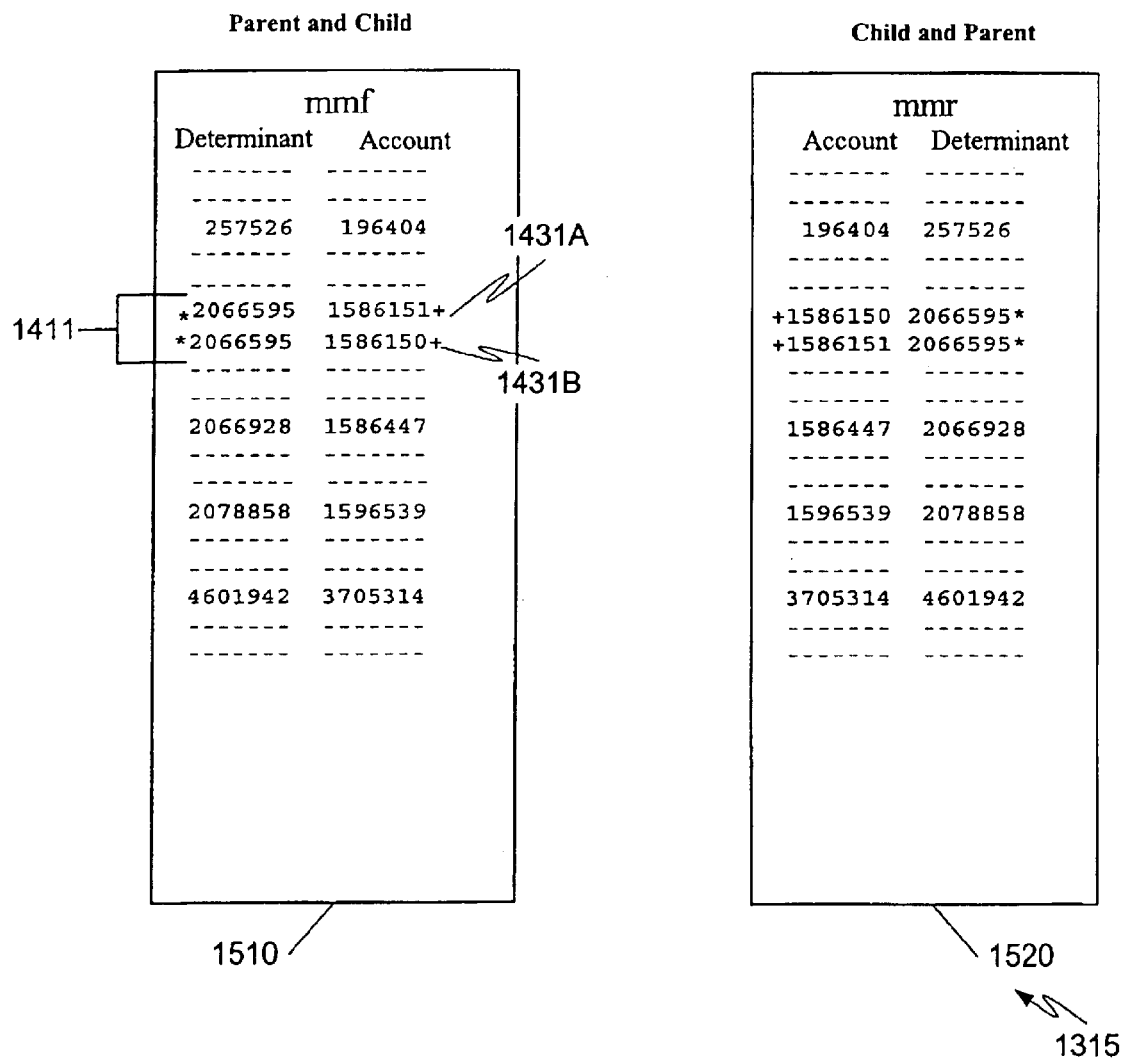
FIG. 15 illustrates exemplary MMX files for mapping instances between various groups, and vice versa, according to one embodiment of the present invention.

As mentioned above, MMX file 1315 maps a relationship between an instance of person group 1310 and instance(s) of account group 1330, and vice versa. In one embodiment of the present invention, MMX file 1315 includes a pair of files, such as an MMF file 1510 and an MMR file 1520 as illustrated in FIG. 15. With respect to person 1410, MMX file 1315 may be used to identify accounts 1430, if any, for that person 1410. In particular, line 1411 is used as an index to MMF file 1510 to return any relationships between person 1410 and accounts 1430. As illustrated in FIG. 15, line 1411 provides two accounts related to person 1410, namely those accounts referenced by lines 1431A and 1431B having values "1586151" and "1586150" respectively. These accounts correspond to accounts 1430A and 1430B illustrated in FIG. 14. Thus, information associated with accounts 1430A and 1430B related to person 1410 may be retrieved using these values as indexes to data files associated with account group 1330.

Figure 16:
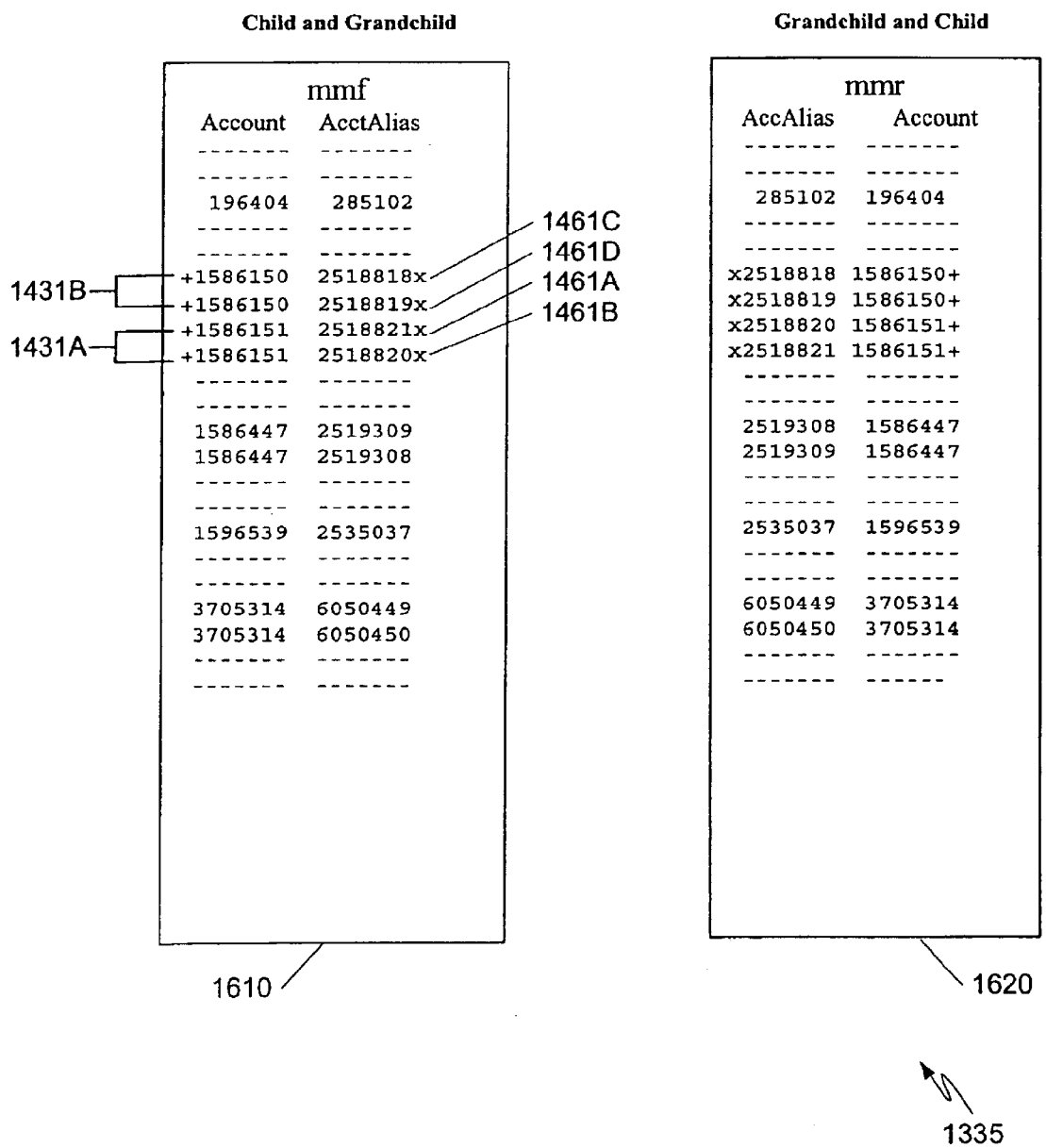
FIG. 16 illustrates other exemplary MMX files for mapping instances between various groups, and vice versa, according to one embodiment of the present invention.

In a similar manner, MMX file 1335 maps relationship between instances of account group 1330 and instances of account alias group 1360. In one embodiment of the present invention, MMX file 1335 includes a pair of files, such as an MMF file 1610 and an MMR file 1620 as illustrated in FIG. 16. With respect to account 1430A, MMX file 1335 may be used to identify account aliases 1460, if any. In particular, line 1431A is used as an index to MMF file 1610 to return any relationships between this instance of account 1430A and any instances of account aliases 1460. As illustrated in FIG. 16, line 1431A provides two account aliases related to account 1430A, namely those account aliases referenced by lines 1461A and 1461B having values "2518821" and "2518820", respectively. These account aliases correspond to account aliases 1460A and 1460B as illustrated in FIG. 14. Thus, information associated with account aliases 1460A and 1460B related to account 1430 may be retrieved using lines 1461A, 1461B as indexes to data files associated with account alias group 1360. A similar process may be followed for account 1430B.

In a like manner, other information from address group 1320, legal docket group 1340, and lawyer group 1350 may be located and assembled for person 1410. As thus described, an entire context for person 1410, representing all information available in hierarchy 1300, may be assembled.

Figure 17:
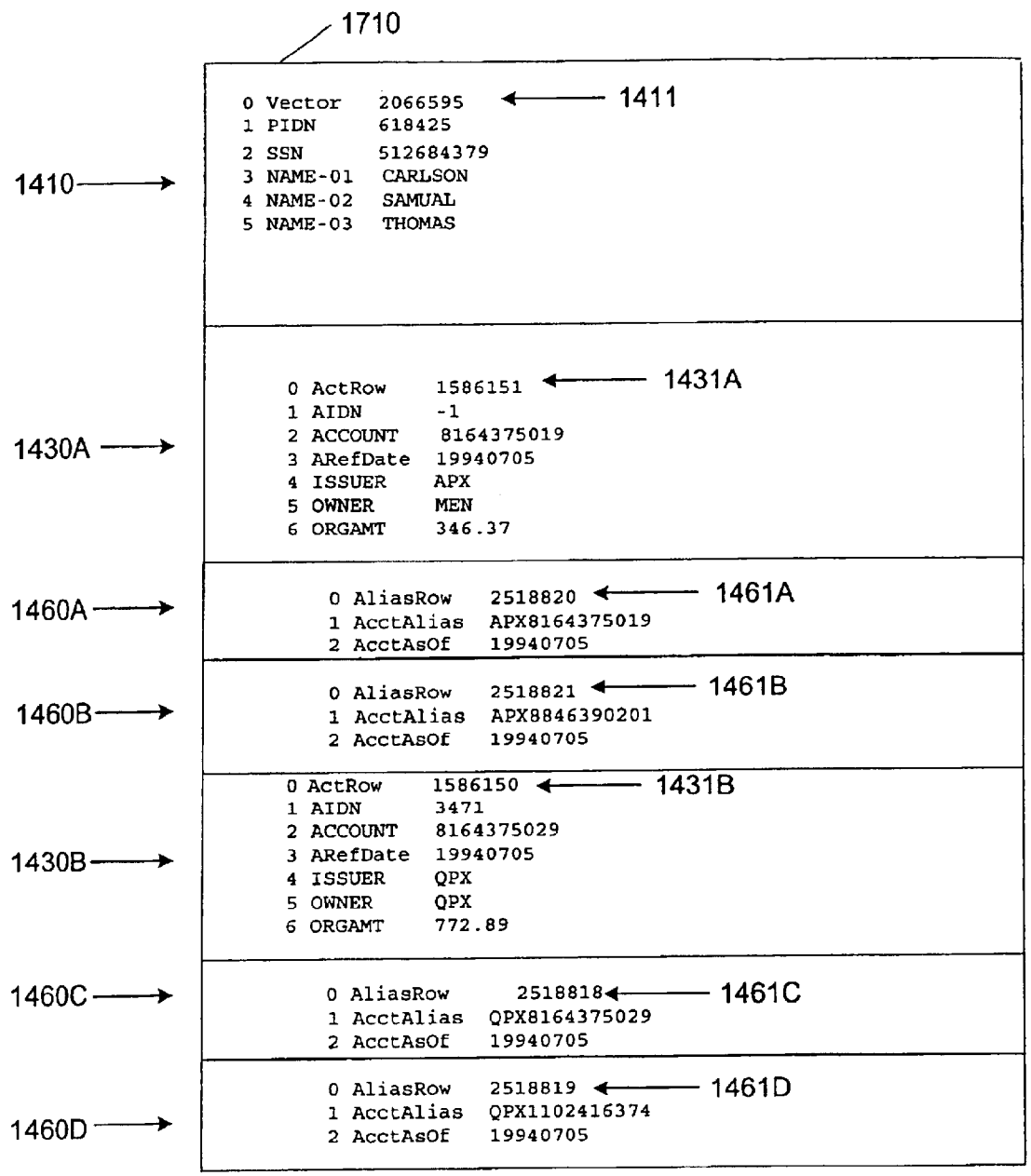
FIG. 17 illustrates an exemplary context according to one embodiment of the present invention.

FIG. 17 illustrates an exemplary user interface 1700 for a context 1710 including various data retrieved from data files 140 associated with person group 1310, account group 1330, and account alias group 1360. (A full context would include data, if any, from all groups included in FIG. 13. For purposes of clarity and understanding, this data has not been illustrated.)

As illustrated in FIG. 17, information from various groups in hierarchy 1300 are offset from that of other groups in user interface 1700 to provide an indication of relationships among the groups. In particular, account 1430A is offset from person 1410 because account group 1430 is a descendant of person group 1310 in hierarchy 1300. Likewise, account aliases 1460A, 1460B are offset from account 1430A because account alias group 1330 is a descendant of account group 1430. Similar relationships can be determined from among person 1410, account 1430B and account aliases 1460C, 1460D. Other forms of user interfaces may be used to convey a similar indication of relationships among the information in context 1710. For example, a user interface similar to the form illustrated in FIG. 13 may be implemented with each block including the information located therein.

In one embodiment of the present invention, user interface 1700 provides an indication of relationships in an outline fashion as illustrated in FIG. 17. Thus, account aliases 1460A, 1460B are directly related to account 1430A and likewise 1460C, 1460D are directly related to account 1430B. In similar outline fashion, accounts 1430A, 1430B are directly related to person 1410.

In the example illustrated in FIG. 17, two instances 1430A, 1430B of account group 1330 descend from an instance 1410 of person group 1310. Other instances of other groups descending from person group 1310 may be included in context 1710 as would be apparent. These groups may be organized and presented in a similar fashion at that described above.

First Exemplary Query

Aspects of the present invention have thus far been described in terms of how data is organized and stored in a network or a hierarchy. Further aspects of the present invention have also been described in terms of how this network may be used to retrieve information in the form of contexts from that network. Now the present invention is described in terms of how pertinent information may be located and retrieved using the network. According to one embodiment of the present invention, any search of the network returns the pertinent information in one or more contexts. Thus, query terms corresponding to groups in the network are first evaluated at an appropriate level and then propagated through the network to at least one predecessor group, and in some embodiments as described below, to the parent group, so that the matching contexts may be retrieved. This process is described using the example illustrated in FIGS. 18–24 and Tables II and III.

In this example, database 150 includes information pertaining to course offerings provided by a university. Table II illustrates a list of course offerings in terms of one or more prerequisites for each course as well as one or more degree requirements that are satisfied by each course. Table III illustrates degrees awarded by the university in terms of their degree requirements.

Figure 18:
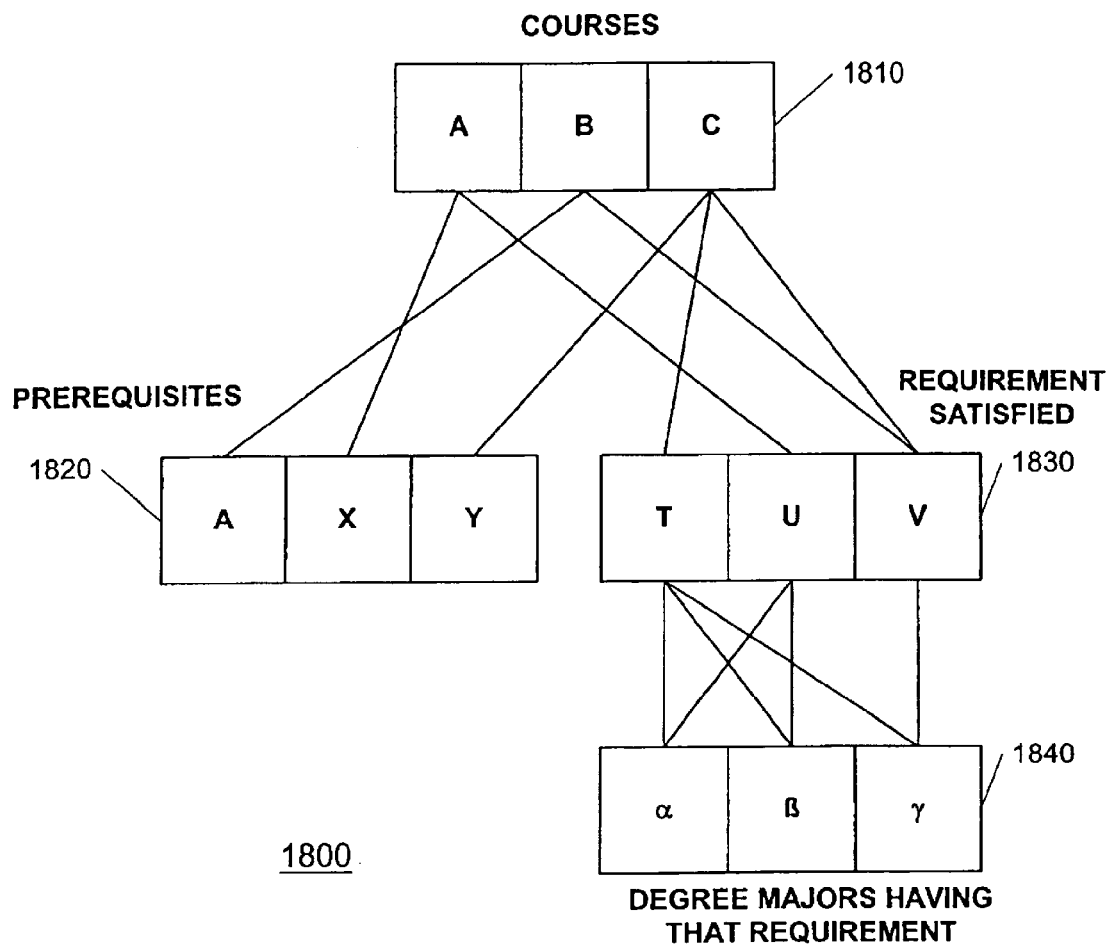
FIG. 18 illustrates another exemplary hierarchy according to one embodiment of the present invention.

FIG. 18 illustrates a network, more particularly, a hierarchy 1800 that embodies information from Tables II and III. In hierarchy 1800, a course group 1810 is selected as a parent group. A prerequisite group 1820 descends from course group 1810 as does a requirements group 1830. This portion of hierarchy 1800 reflects the information in Table II. A majors group 1840 descends from requirements group 1830. This portion of hierarchy 1800 reflects the information in Table III.

The information in Table II and Table III as well as that in hierarchy 1800 is highly condensed for purposes simplicity and clarity. Whereas Table II specifies an instance of course group 1810 as "Course A," in a typical application, this instance may include various data fields, such as Course Title: "Introduction to Molecular Biology," Professor: "Dr. James Watkins," Course Text: "Molecular Biology for Beginners," Course Days: "MWF," Course Time: "8:00 a.m.," Course Credits: "3," etc. These exemplary data fields and their values may form the instance of course group 1810 that is henceforth referred to as "Course A." Such complexity has been discussed with respect to the former example illustrated in FIGS. 14–17. Similar simplifications have been made for the other groups in this example.

TABLE II

| COURSE OFFERINGS | | |
|---|---|---|
| COURSE | PREREQUISITE COURSES | DEGREE REQUIREMENT SATISFIED |
| A | X | U |
| B | A | V |
| C | Y | T, V |

TABLE III

| DEGREE REQUIREMENTS | |
|---|---|
| DEGREE MAJOR | DEGREE REQUIREMENTS |
| T | α, β, γ |
| U | α, β |
| V | γ |

FIG. 19 illustrates data files 1900 reflective of the respective information for each of the groups in hierarchy 1800. In particular, a data file 1910 corresponds to courses in course group 1810; a data file 1920 corresponds to prerequisites in prerequisites group 1820; a data file 1930 corresponds to degree requirements in requirements group 1830; and a data file 1940 corresponds to degree majors in major group 1840. As illustrated in FIG. 19, explicit line numbers are included in a left-hand column of each of data files 1900. As would be understood, the left-hand column may be eliminated and an implicit line number may be used as described above. As also illustrated, each of the groups includes only one data file 1900, each with only one data field. This example was chosen for purposes of clarity and understanding. As would be apparent, the groups may be associated with several data files, each with multiple data fields as in previously described examples.

FIGS. 20–22 illustrate MMX files reflective of the various relationships between the groups in hierarchy 1800 in accordance with Table II and Table III. Specifically, FIG. 20A illustrates an MMF file 2010 mapping course group 1810 to prerequisites group 1820; FIG. 20B illustrates an MMR file 2020 mapping prerequisites group 1820 to course group 1810; FIG. 21A illustrates an MMF file 2110 mapping course group 1810 to requirements group 1830; FIG. 21B illustrates an MMR file 2120 mapping requirements group 1830 to course group 1810; FIG. 22A illustrates an MMF file 2210 mapping requirements group 1830 to degree majors group 1840; and FIG. 22B illustrates an MMR file 2220 mapping degree majors group 1840 to requirements group 1830.

Once information from Tables II and III is organized according to the present invention, a query may be made to extract pertinent information therefrom. A natural language exemplary query is "Given Course X has been taken, what courses can Student take?" From the natural language query, relevant search terms are extracted according to well-known techniques. In this example, the relevant search terms are "X." Next, the search terms are queried against each group in hierarchy 1800 without regard to any particular data file in which "X" may or may not occur. Each match is identified as an occurrence of "X" within hierarchy 1800.

For each occurrence of "X," hierarchy 1800 is traversed, beginning at the occurrence, upwardly through hierarchy 1800 to build an upward portion of a context. In one embodiment of the present invention, hierarchy 1800 is upwardly traversed to at least one predecessor group. In other embodiments of the present invention, hierarchy 1800 is upwardly traversed until a parent group is reached. In either case, once an appropriate predecessor is located, hierarchy 1800 is downwardly traversed from that predecessor through each of the groups to build a downward portion of the context. While traversing hierarchy 1800 in either direction, information related to "X" is extracted thereby building the context. According to one embodiment of the present invention, a separate context is built for each occurrence of "X" located in hierarchy 1800.

Figure 23:
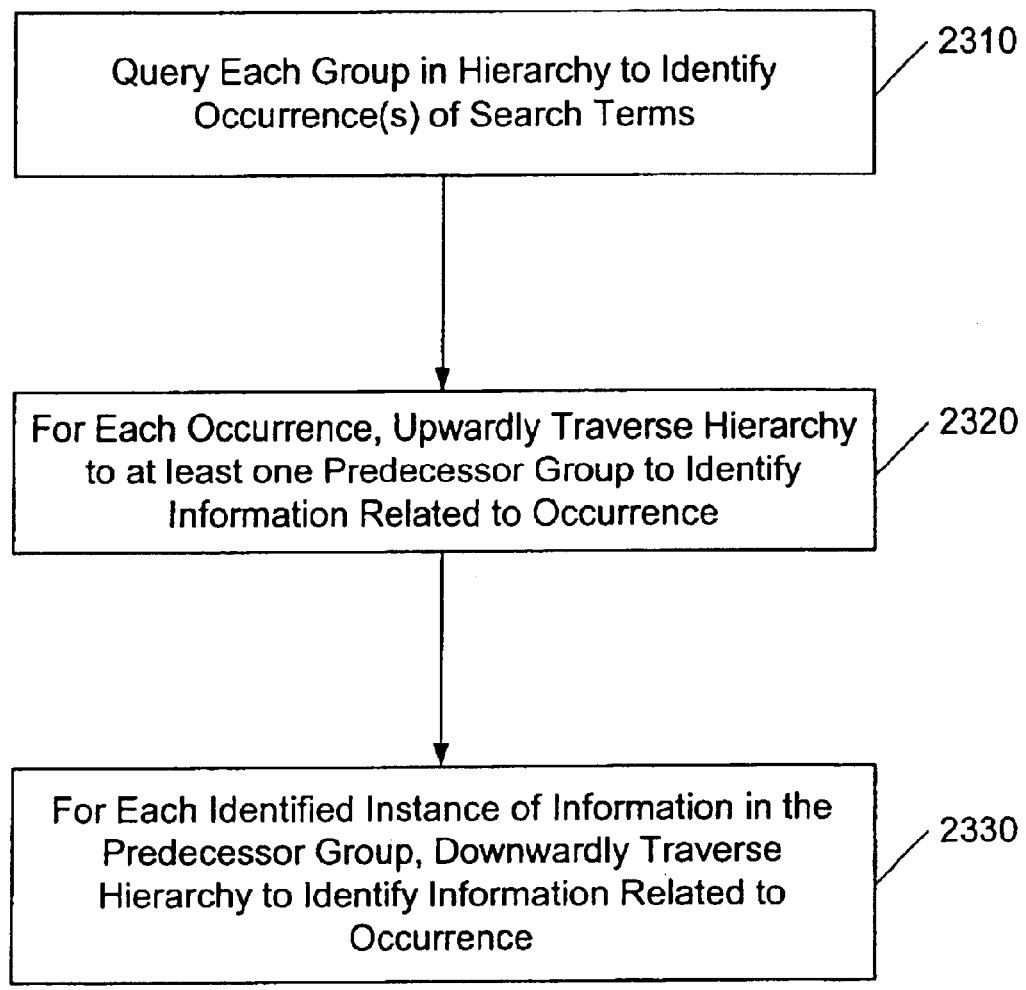
FIG. 23 illustrates an operation of one embodiment of the present invention.
Figure 24:
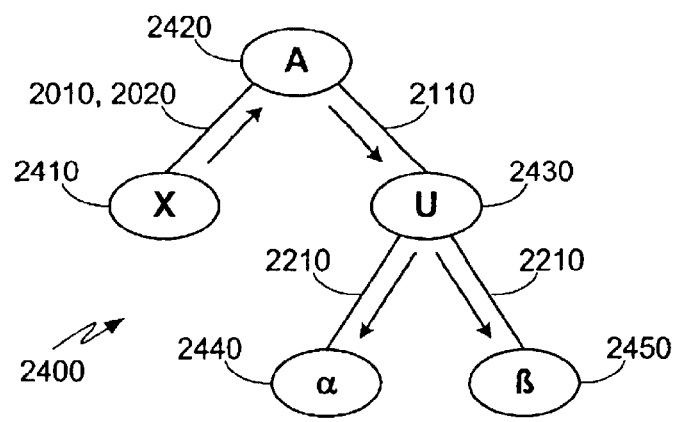
FIG. 24 illustrates an exemplary context built in response to a first query according to one embodiment of the present invention.

This example is now described in specific terms with respect to FIGS. 19–24. FIG. 23 illustrates an operation 2300 of one embodiment of the present invention. FIG. 24 illustrates a context 2400 that is built for the query of this example according to one embodiment of the present invention. In an operation 2310, a query is made against each of the groups in hierarchy 1800 to locate all occurrences of the search terms in hierarchy 1800. In this example, the only occurrence of "X" in hierarchy 1800 is an instance of prerequisites group 1820 located at "Line 2" of prerequisites data file 1920. This occurrence is identified as occurrence 2410 in context 2400 in FIG. 24.

In an operation 2320, hierarchy 1800 is upwardly traversed using relationship information between the group associated with occurrence 2410 and any other group in hierarchy 1800 to identify information related to occurrence 2410 in at least one predecessor group. In one embodiment of the present invention, MMR files (such as MMR file 2020, 2120, and 2220) are used to store such relationship information thereby allowing the traversal of hierarchy 1800 in an upward direction toward predecessors. Other types of mechanisms for storing relationship information may be utilized to accomplish similar results as would be apparent. In this example, MMR file 2020 maps the relationships between prerequisites group 1820 and course group 1810, the only predecessor group to prerequisites group 1820.

In operation 2320, MMR file 2020 is accessed, using "Line 2" (which corresponds to a location of "X" in prerequisites data file 1920) as an index, to identify related courses in course data file 1910. In this example, MMR file 2020 specifies "Line 1" as the only course related to this prerequisite. Using "Line 1" as an index to course data file 1910 identifies "A" as the course. Any information so identified, such as information 2420 corresponding to "A," is added to context 2400.

Operation 2320 may be repeated to add instances of the groups to build context 2400 in the upward direction until at least one predecessor group is identified, a particular predecessor group is identified, or the parent group is identified. In the event that occurrence 2410 is an instance of the parent group, operation 2320 may not be performed (ie., the parent group has no predecessors). In this example, course group 1810 is the parent group so no further upward traversals are performed.

Operation 2320 may also be repeated to add instances of the groups to build context 2400 in the upward direction for each relationship associated with occurrence 2410 and instances of the predecessor group. For example, if MMR file 2020 includes a one-to-many relationship for "X," each path toward the predecessor group would be used to traverse hierarchy 1800 and form corresponding contexts. In this example, no other relationships are associated with occurrence 2410 and instances of course group 1810.

Operation 2320 may also be repeated to build contexts for each predecessor group related to occurrence 2410. In other words, if other relationship information exists between prerequisites group 1820 and another predecessor group in hierarchy 1800, this relationship information may also be traversed to determine other upward paths. In this example, prerequisites group 1820 has no other predecessor groups in hierarchy 1800.

According to the present invention, a separate context is formed for each upward path in hierarchy 1800 from occurrence 2410. In other words, a separate context is ultimately formed for each instance of related information located in a parent group (or other predecessor group). In this example, only one instance of related information, e.g., information 2420, is located in hierarchy 1800, so only context 2400 is built. This is discussed in further detail below.

In an operation 2330, relationship information between the parent group (or other predecessor group) and any other group in hierarchy 1800 is accessed to downwardly traverse hierarchy 1800 to each descendant, each descendant of descendants, etc. In one embodiment of the present invention, MMF files (such as MMF files 2010, 2110, and 2210) are used to traverse hierarchy 1800 in a downward direction toward descendants. Other types of mechanisms for storing relationship information may be utilized to accomplish similar results as would be apparent. In this example, MMF file 2010 maps the relationships between instances of course group 1810 and instances of prerequisites group 1820; MMP file 2110 maps the relationships between instances of course group 1810 and instances of requirements group 1830; and MMF file 2210 maps the relationships between instances of requirements group 1830 and instances of majors group 1840. No other relationships are specified in hierarchy 1800.

In this example, during operation 2330, MMF file 2010 is accessed, using "Line 1" (which corresponds to a location of "A" in course data file 1910) as an index, to identify related prerequisites in prerequisites data file 1920. In this example, accessing MMF file 2010 returns the already identified relationship "X" from prerequisites data file 1920. However, in other examples, such as those where "A" may have one-to-many relationships with prerequisites in prerequisites data file 1920, additional information related to context 2400 would be retrieved. Furthermore, even though "X" is already identified, additional information related to context 2400 from descendants of "X" must be retrieved by downwardly traversing hierarchy 1800. In this example, no descendants of "X" exist.

Operation 2330 may also be repeated to build contexts in the downward direction for each relationship associated with the parent group and instances of descendant groups. In this example, during operation 2330, MMF file 2110 is also accessed, using "Line 1" as an index to identify related requirements in requirements data file 1930. In this example, MMF file 2110 specifies "Line 2" as the only requirement related to this course. Using "Line 2" as an index to requirement data file 1930 identifies "U" as the requirement. Any information so identified, such as information 2430 corresponding to "U," is added to context 2400.

Operation 2330 may also be repeated to build contexts in the downward direction for each relationship associated with descendants of the parent group and instances of their descendant groups. In this example, during operation 2330, MMF file 2210 is also accessed, using "Line 2" (which corresponds to a location of "U" in requirements data file 1930) as an index, to identify related degree majors in degree majors data file 1940. In this example, MMF file 2210 specifies "Line 1" and "Line 2" as the degree majors related to this requirement. Thus, operation 2330 is repeated for each of these instances. Using "Line 1" as an index to degree majors data file 1940 identifies "α" as the degree major and using "Line 2" as an index identifies "β" as the degree major. This information 2440 and 2450, respectively, is added to context 2400.

In this example, context 2400 is fully built with respect to the query of "X." In an operation 2340, context 2400 is presented to user 110 as a response to the query. In natural language, the response to the query of "X" is "Given Course 'X' is completed, Student may take Course 'A,' which satisfies Requirement 'U,' which is required by Degree Major 'α' and Degree Major 'β.'"

Second Exemplary Query

Figure 25:
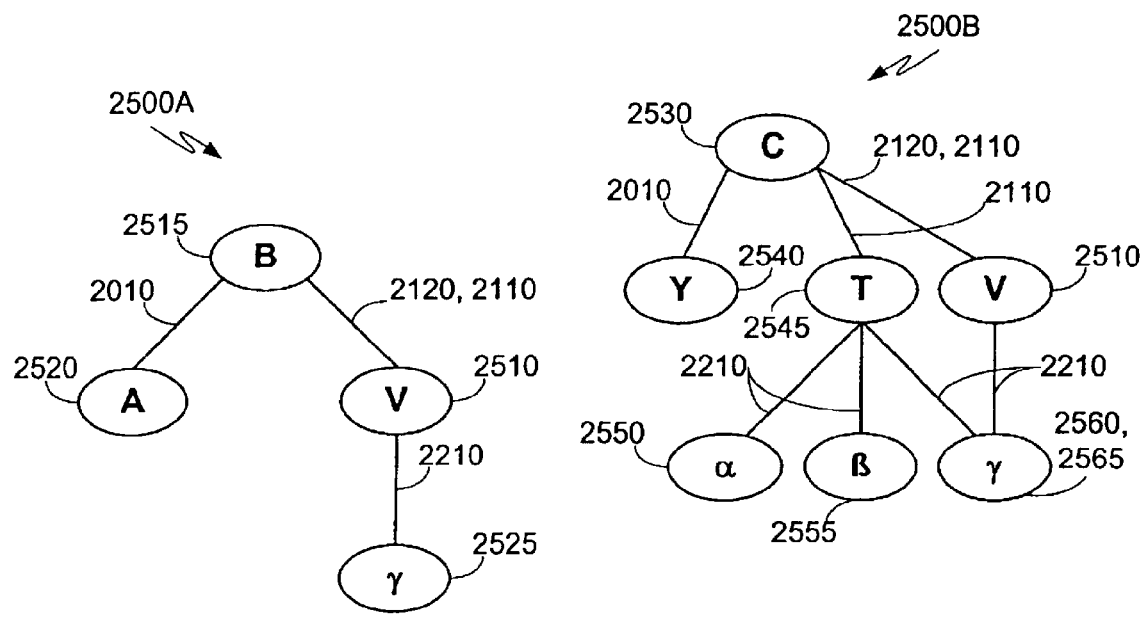
FIG. 25 illustrates another exemplary context built in response to a second query according to one embodiment of the present invention.

Another natural language exemplary query is "What courses does Student need to satisfy Requirement V?" In this example, the relevant search term is "V." Operation 2300 queries hierarchy 1800 with "V" and subsequently builds contexts 2500A and 2500B as illustrated in FIG. 25. In an operation 2310, a query is made against each of the groups in hierarchy 1800 to locate all occurrences of the search terms in hierarchy 1800. In this example, the only occurrence of "V" in hierarchy 1800 is an instance of requirements group 1830 located at "Line 3" of requirements data file 1930. This occurrence is identified as an occurrence 2510 in context 2500A as illustrated in FIG. 25.

In operation 2320, hierarchy 1800 is upwardly traversed using relationship information between the group associated with occurrence 2510 and any other group in hierarchy 1800 to identify information related to occurrence 2510 in at least one predecessor group. In this example, MMR file 2120 maps the relationships between requirements group 1830 and course group 1810, the only predecessor group to requirements group 1830.

MMR file 2120 is accessed, using "Line 3" (which corresponds to a location of "V" in requirements data file 1930) as an index, to identify related courses in course data file 1910. In this example, MMR file 2120 specifies two relationships, namely, "Line 2" and "Line 3," as related to this requirement. Using "Line 2" as an index to course data file 1910 identifies "B" as the related course. Using "Line 3" as an index to course data file 1910 identifies "C" as the related course. Because each of these relationships represents a separate upward path, a separate context is formed. More particularly, a context 2400A is formed for an upward path to course "B" and a context 2400B is formed for an upward path to course "C." Thus, information 2515 corresponding to course "B" is added to context 2400A and information 2530 corresponding to course "C" is added to context 2400B.

First, for purposes of illustration, context 2400A is fully built. Because no other predecessor group exists in hierarchy 1800, operation 2320 is complete with respect to context 2400A and processing continues at operation 2330. In this example, during operation 2330, MMF file 2010 is accessed, using "Line 2" (which corresponds to a location of "B" in course data file 1910) as an index, to identify related prerequisites in prerequisites data file 1920. In this example, accessing MMF file 2010 returns "Line 1" as the only prerequisite related to this course. Using "Line 1" as an index to prerequisite data file 1920 identifies "A" as the prerequisite. Accordingly, information 2520 corresponding to prerequisite "A" is added to context 2500A. In this example, no other prerequisites are related to "B" nor do further groups descend from prerequisites group 1820.

In this example, during operation 2330, MMF file 2110 is also accessed, using "Line 2" as an index to identify related requirements in requirements data file 1930. In this example, MMF file 2110 specifies "Line 3" as the only requirement related to this course. Using "Line 3" as an index to requirement data file 1930 returns the already identified "V" as the requirement.

Operation 2330 is repeated for descendants of requirements group 1830. In this example, during operation 2330, MMF file 2210 is also accessed, using "Line 3" (which corresponds to a location of "V" in requirements data file 1930) as an index, to identify related degree majors in degree majors data file 1940. In this example, MMF file 2210 specifies "Line 3" as the degree major related to this requirement. Using "Line 3" as an index to degree majors data file 1940 identifies "Y" as the degree major. This information 2525 is added to context 2500A.

In this example, context 2500A is fully built with respect to the query of "V." Next, context 2500B is fully built. In this example, during operation 2330, MMF file 2010 is accessed, using "Line 3" (which corresponds to a location of "C" in course data file 1910) as an index, to identify related prerequisites in prerequisites data file 1920. In this example, accessing MMF file 2010 returns "Line 3" as the prerequisite related to this course. Using "Line 3" as an index to prerequisite data file 1920 identifies "Y" as a prerequisite. Accordingly, information 2540 corresponding to prerequisite "Y" is added to context 2500B. In this example, no other prerequisites are related to "C" nor do further groups descend from prerequisites group 1820.

During operation 2330, MMF file 2110 is also accessed, using "Line 3" as an index to identify related requirements in requirements data file 1930. In this example, MMF file 2110 specifies "Line 1" and "Line 3" as the requirements related to this course. Using "Line 1" as an index to requirement data file 1930 returns "T" as the requirement and using "Line 3" as an index to requirement data file 1930 returns the already identified "V" as the requirement. This new information 2545 corresponding to requirement "T" is added to context 2500B.

Operation 2330 is repeated for descendants of requirements group 1830. In this example, during operation 2330, MMF file 2210 is also accessed, first using "Line 1" (which corresponds to a location of "T" in requirements data file 1930) and next using "Line 3" (which corresponds to a location of "V" in requirements data file 1930).

With respect to "Line 1" as an index, MMF file 2210 specifies "Line 1," "Line 2," and "Line 3" as the degree majors related to this requirement. Using these indices to degree majors data file 1940 identifies "α," "β," and "γ" as the degree majors, respectively. These are added to context 2500A as information 2550, information 2555, and information 2560, respectively.

With respect to "Line 3" as an index, MMF file 2210 specifies "Line 3" as the degree major related to this requirement. Using "Line 3" as an index to degree majors data file 1940 identifies "γ" as the degree majors, respectively. This information 2565 is added to context 2500B. At this point, context 2500B is fully built.

Context 2500A and context 2500B form a response to the query. In natural language, the response to the query of "V" is "To satisfy Requirement 'V,' Course 'B' and Course 'C' must be taken. Course 'B' has Course 'A' as a prerequisite and in part, satisfies Requirement 'V' which is required by Degree Major 'γ.' Course 'C' has Course 'Y' as a prerequisite and in part, satisfies Requirement 'T' which is required by Degree Major 'α,' Degree Major 'β,' and Degree Major 'γ' and also satisfies Requirement 'V' which is required by Degree Major 'γ.'"

In the example just described, the query was satisfied by two separate contexts: context 2500A corresponding to Course 'B' and context 2500B corresponding to Course 'C.' In this example, the contexts correspond to different instances of the same parent group; however, in other examples, the contexts may correspond to instances of separate parent groups, or some combination thereof.

In the examples described above, hierarchy 1300 and hierarchy 1800 represent two or three levels descending from the parent group with a handful of groups at each level. As would be appreciated, the present invention may operate with hierarchies having any number of levels with any number groups at each level. As would also be appreciated, the present invention may operate with networks not organized as hierarchies or with groups at any levels. In any case, each group may include any number of data fields as would also be apparent. Contexts built from these types of hierarchies (or networks) may resemble significant databases themselves once all information related to the search term is extracted. In fact, these contexts may be used as subsets of the original database(s) and downloaded into a laptop computer, PDA, or similar device, for further querying, report generation, etc. This may be particularly useful where these types of devices are unable to access or contain the original database(s) themselves.

Compound Queries

Compound queries, or those queries with multiple search terms, may be handled in a variety of ways. In one embodiment of the present invention, each individual search term in the compound query is used to generate its own set of contexts and then the contexts are merged with respect to the AND's and OR's of the compound query. In some embodiments of the present invention, particularly those where search terms are AND'ed, a first search term may queried against the hierarchy to build a first context. A second search term is then evaluated against the first context rather than against the entire hierarchy. Further AND'ed search terms may be evaluated in a similar manner. In these embodiments, OR'ed search terms are just included as separate contexts as would be apparent.

Internet Queries

A particularly useful application of the present invention is as an engine for searching the Internet. Typical queries to the Internet using conventional search engines often return hundreds of 'hits' to a given search term forcing the user to wade through a morass of information with little appreciable relationship to the search term. Sometimes, in order to reduce the number of 'hits' to something manageable, the user is forced to develop complex search strings.

The Internet is nothing more than a vast database of information with various relationships residing therein. The present invention may be used to organize this information into a network or hierarchy that may then be queried as discussed above. Rather than return 'hits,' the present invention returns one or more contexts in which the search terms reside. Because each context includes information that is generally related, the search term found in one context may take on different meaning from the same search term in another context. In other words, the context gives the search term meaning. Thus, a user may evaluate each of the contexts in order to eliminate those contexts not relevant to his understanding or frame of reference with respect to the search term. The user may then traverse each of the remaining contexts to explore them for information relevant to his query.

Transformation to a Numeric Format

In some embodiments of the present invention, some or all of the information in database 150 may be transformed into a numeric format. One particularly useful mechanism for transforming data into a numeric format is described in application Ser. No. 09/617,047, entitled "System and Method for Storing Data." As would be apparent, other mechanisms may be used.

Once information (particularly, non-numeric information) in the groups is transformed into a numeric format, the groups may be readily sorted in numeric order based on one or more of the data fields within each group. Thereafter, locating information within these groups involves simple mathematical compare operations on single numeric values as opposed to text strings. Such operations can be performed at high speed by today's processors.

Discrete vs. Continuous Information

All of the data described thus far has been discrete data. However, in some embodiments, the present invention may be extended to continuous data as well. Instead of tables (e.g., MMX files) mapping relationships between discrete values, "MMX functions" could map relationships between x and y as $y=f(x)$ and inversely, $x=f^{-1}(y)$, where x and y may themselves be functions of some phenomenon.

Fourier series, Taylor series, sampling, or other method could be used to approximate these functions over a finite or even an infinite interval. Properties of continuous data (i.e., derivatives, integrals, etc.) may also be used to characterize and exploit information in the data, just as a numeric representation can be used to characterize nonnumeric data. Furthermore, any form of mathematical analyses including vector analysis, tensor analysis, etc., may be used as tools to characterize and exploit the information therein as well.

While the invention has been described herein in terms of a preferred embodiment, it is not so limited and is limited only by the scope of the following claims, as would be apparent to one skilled in the art.

What is claimed is:

1. A method for retrieving information from a database organized in a hierarchy having a parent, a first plurality of descendants each having a direct relationship the parent, and a second plurality of descendants each having an indirect relationship to the parent through at least one of the first plurality of descendants, at least some of the second plurality of descendants having a direct relationship to the first plurality of descendants, the method comprising:

locating an occurrence of a search term in either said first plurality of descendants or said second plurality of descendants;

traversing the hierarchy from said occurrence to an instance of the parent using at least one of the direct relationship and the indirect relationship;

traversing the hierarchy from said instance of the parent to an instance of one of the first plurality of descendants using the direct relationship;

traversing the hierarchy from said instance of one of the first plurality of descendants to an instance of one of the at least some of the second plurality of descendants using the direct relationship therebetween; and building a context corresponding to said occurrence, said instance of the parent, said instance of one of the first plurality of descendants, and said instance of one of the at least some of the second plurality of descendants.

2. The method of claim 1, wherein said traversing the hierarchy from said instance of the parent to an instance of one of the first plurality of descendants comprises traversing the hierarchy from said instance of the parent to each instance of the first plurality of descendants directly related to thereto.

3. The method of claim 2, wherein said building a context comprises building a context corresponding to said occurrence, said instance of the parent, each instance of one of the first plurality of descendants, and said instance of one of the at least some of the second plurality of descendants.

4. The method of claim 1, wherein said traversing the hierarchy from said instance of one of the first plurality of descendants to an instance of one of the at least some of the second plurality of descendants comprises traversing the hierarchy from said instance of one of the first plurality of descendants to each instance of the at least some of the second plurality of descendants directly related to thereto.

5. The method of claim 4, wherein said building a context comprises building a context corresponding to said occurrence, said instance of the parent, said instance of one of the first plurality of descendants, and each instance of one of the at least some of the second plurality of descendants.

6. The method of claim 1, wherein said traversing the hierarchy from said instance of the parent to an instance of one of the first plurality of descendants comprises traversing the hierarchy from said instance of the parent to each instance of the first plurality of descendants directly related to thereto; and wherein said traversing the hierarchy from said instance of one of the first plurality of descendants to an instance of one of the at least some of the second plurality of descendants comprises traversing the hierarchy from each instance of one of the first plurality of descendants to each instance of the at least some of the second plurality of descendants directly related to thereto.

7. The method of claim 6, wherein said building a context comprises building a context corresponding to said occurrence, said instance of the parent, each instance of one of the first plurality of descendants, and each instance of one of the at least some of the second plurality of descendants.

8. The method of claim 1, further comprising:

locating a second occurrence of the search term in either said first plurality of descendants or said second plurality of descendants;

traversing the hierarchy from said second occurrence to an second instance of the parent using at least one of the direct relationship and the indirect relationship;

traversing the hierarchy from said second instance of the parent to a second instance of one of the first plurality of descendants using the direct relationship;

traversing the hierarchy from said second instance of one of the first plurality of descendants to a second instance of one of the at least some of the second plurality of descendants using the direct relationship therebetween; and building a second context corresponding to said second occurrence, said second instance of the parent, said second instance of one of the first plurality of descendants, and said second instance of one of the at least some of the second plurality of descendants.

9. The method of claim 8, further comprising presenting said context and said second context to a user.

10. A method far retrieving information from a database organized in a hierarchy having a plurality of parents, a first plurality of descendants, and a second plurality of descendants, each of the first plurality of descendants having direct relationships to at least one of the plurality of parents, each of the second plurality of descendants having indirect relationships to at least one of the plurality of parents, at least some of the second plurality of descendants having second direct relationships to at least one of the first plurality of descendants, the method comprising:

locating an occurrence of a search term in either one of the first plurality of descendants or one of the second plurality of descendants;

traversing the hierarchy from said occurrence to an instance of one of the plurality of the parents using at least one of the direct relationships or the indirect relationships;

traversing the hierarchy from said instance of one of the plurality of parents to an instance of one of the first plurality of descendants using the direct relationships;

traversing the hierarchy from said instance of one of the first plurality of descendants to an instance of one of the at least some of the second plurality of descendants using the second direct relationships;

locating a second occurrence of the search term in either one of the first plurality of descendants or one of the second plurality of descendants; traversing the hierarchy from said second occurrence to an instance of a second one of the plurality of the parents using at least one of the direct relationships or the indirect relationships;

traversing the hierarchy from said instance of said second one of the plurality of parents to an instance of a second one of the first plurality of descendants using the direct relationships;

traversing the hierarchy from said instance of said second one of the first plurality of descendants to an instance of a second one of the at least some of the second plurality of descendants using the second direct relationships;

building a first context corresponding to said occurrence, said instance of one of the plurality of the parents, said instance of one of the first plurality of descendants, and said instance of one of the at least some of the second plurality of descendants; and building a second context corresponding to said second occurrence, said instance of said second one of the plurality of the parents, said instance of said second one of the first plurality of descendants, and said instance of said second one of the at least some of the second plurality of descendants.

11. A method for retrieving data from a database corresponding to a search term comprising:

organizing the data, based on relationships among the data, into a hierarchy including at least one predecessor group and a plurality of descendant groups, wherein said organizing the data comprises forming a relational table indicative of relationships between instances of said at least one predecessor group and instances of said plurality of descendant groups;

locating an occurrence of the search term in one of said plurality of descendant groups;

traversing said network from said occurrence in said one of said plurality of descendant groups to related data in said at least one predecessor group using said relationships among the data; and building a context including said occurrence and said related data thereby retrieving data from the database corresponding to the search term.

12. The method of claim 11, further comprising traversing said hierarchy from said related data in said at least one predecessor group to second related data in said plurality of descendant groups using said relationships among the data.

13. The method of claim 12, wherein said building a context comprises building a context including said occurrence, said related data, and said second related data thereby retrieving data from the database corresponding to the search term.

14. The method of claim 11, further comprising traversing said hierarchy from said related data in said at least one predecessor group to a plurality of second related data in said plurality of descendant groups using said relationships among the data, said plurality of second related data corresponding to each instance of data in said plurality of descendant groups that is related to said related data in said at least one predecessor group.

15. The method of claim 14, wherein said building a context comprises building a context including said occurrence, said related data, and said plurality of second related data thereby retrieving data from the database corresponding to the search term.

16. The method of claim 11, wherein said traversing said hierarchy comprises traversing said hierarchy from said occurrence in said one of said plurality of descendant groups to a first plurality of related data in said at least one predecessor group using said relationships among the data, said first plurality of related data corresponding to each instance of data in said at least one predecessor group that is related to said occurrence.

17. The method of claim 16, further comprising traversing said hierarchy from each of said first plurality of related data in said at least one predecessor group to at least one second related data in said plurality of descendant groups using said relationships among the data, said at least one second related data corresponding to each instance of data in said plurality of descendant groups that is related to each of said first plurality of related data in said at least one predecessor group.

18. The method of claim 17, wherein said building a context comprises building a context including said occurrence, said first plurality of related data, and said at least one second related data thereby retrieving data from the database corresponding to the search term.

19. The method of claim 11, further comprising storing said context as a subset of the database.

20. The method of claim 19, further comprising converting the data to a numeric format in an appropriate number system.

21. The method of claim 11, wherein said forming a relational table comprises forming a many-to-many transfer file indicative of relationships between said instances of said at least one predecessor group and said instances of said plurality of descendant groups.

22. The method of claim 21, wherein said forming a many-to-many transfer file comprises forming a many-to-many forward transfer file indicative of relationships from said instances of said at least one predecessor group to said instances of said plurality of descendant groups.

23. The method of claim 21, wherein said forming a many-to-many transfer file comprises forming a many-to-many reverse transfer file indicative of relationships from said instances of said plurality of descendant groups to said instances of said at least one predecessor group.

24. The method of claim 11, wherein said organizing the data, based on relationships among the data, into said hierarchy further comprises forming a relational table indicative of relationships between instances of a first one of said plurality of descendant groups and a second one of said plurality of descendant groups.

25. The method of claim 24, wherein said forming a relational table comprises forming a many-to-many transfer file indicative of relationships between said instances of said first one of said plurality of descendant groups and said instances of said second one of said plurality of descendant groups.

26. The method of claim 25, wherein said forming a many-to-many transfer file comprises forming a many-to-many forward transfer file indicative of relationships from said instances of said first one of said plurality of descendant groups to said instances of said second one of said plurality of descendant groups.

27. The method of claim 25, wherein said forming a many-to-many transfer file comprises forming a many-to-many reverse transfer file indicative of relationships from said instances of said second one of said plurality of descendant groups to said instances of said first one of said plurality of descendant groups.

28. The method of claim 11, further comprising converting the data to a numeric format in an appropriate number system.

29. A method for retrieving data from a database corresponding to a search term comprising:

organizing the data, based on relationships among the data, into a network including at least one predecessor group and a plurality of descendant groups;

locating an occurrence of the search term in one of said plurality of descendant groups;

traversing said network from said occurrence in said one of said plurality of descendant groups to related data in said at least one predecessor group using said relationships among the data;

traversing said network from said related data in said at least one predecessor group to a plurality of second related data in said plurality of descendant groups using said relationships among the data, said plurality of second related data corresponding to each instance of data in said plurality of descendant groups that is related to said related data;

building a context including said occurrence, said related data, and said plurality of second related data; and providing the entire context in response to the search term.

30. The method of claim 29, further comprises storing said entire context as a subset of the database.

31. The method of claim 29, wherein said organizing the data, based on relationships among the data, into a network comprises forming a relational table indicative of relationships between instances of said at least one predecessor group and instances of a first one of said plurality of descendant groups.

32. The method of claim 31, wherein said forming a relational table comprises forming a many-to-many transfer file indicative of relationships between said instances of said at least one predecessor group and said instances of said first one of said plurality of descendant groups.

33. The method of claim 32, wherein said forming a many-to-many transfer file comprises forming a many-to-many forward transfer file indicative of relationships from said instances of said at least one predecessor group to said instances of said first one of said plurality of descendant groups.

34. The method of claim 32, wherein said forming a many-to-many transfer file comprises forming a many-to-many reverse transfer file indicative of relationships from said instances of said first one of said plurality of descendant groups to said instances of said at least one predecessor group.

35. The method of claim 29, wherein said organizing the data, based on relationships among the data, into a network further comprises forming a relational table indicative of relationships between instances of a first one of said plurality of descendant groups and a second one of said plurality of descendant groups.

36. The method of claim 35, wherein said forming a relational table comprises forming a many-to-many transfer file indicative of relationships between said instances of said first one of said plurality of descendant groups and said instances of said second one of said plurality of descendant groups.

37. The method of claim 36, wherein said forming a many-to-many transfer file comprises forming a many-to-many forward transfer file indicative of relationships from said instances of said first one of said plurality of descendant groups to said instances of said second one of said plurality of descendant groups.

38. The method of claim 36, wherein said forming a many-to-many transfer file comprises forming a many-to-many reverse transfer file indicative of relationships from said instances of said second one of said plurality of descendant groups to said instances of said first one of said plurality of descendant groups.

39. The method of claim 29, further comprising converting the data to a numeric format in an appropriate number system.

40. The method of claim 29, wherein said organizing the data comprises organizing data into said network including a plurality of predecessor groups, wherein at least one of said plurality of predecessor groups is a descendant group with respect to another one of said plurality of predecessor groups, and wherein at least one of said plurality of predecessor groups is a parent group having no other predecessor groups and only descendant groups.

41. The method of claim 40, wherein said traversing said network from said occurrence in said one of said plurality of descendant groups to related data in said at least one predecessor group comprises traversing said network from said occurrence in said one of said plurality of descendant groups to a plurality of third related data in said plurality of predecessor groups and to parent related data in said parent predecessor group using said relationships among the data, wherein said plurality of third related data corresponds to each instance of said at least one predecessor group that has data related to said occurrence.

42. The method of claim 41, wherein said building a context comprises building a context including said occurrence, said related data, said plurality of second related data, said plurality of third related data, and said parent related data.

43. The method of claim 41, further comprising traversing said network from said parent related data in said parent predecessor group to a plurality of fourth related data in said plurality of descendant groups using said relationships among the data, said plurality of fourth related data corresponding to each instance of said plurality of descendant groups that includes data related to said parent related data.

44. The method of claim 43, wherein said building a context comprises building a context including said occurrence, said related data, said plurality of second related data, said plurality of third related data, said plurality of fourth related data, and said parent related data.

45. The method of claim 29, wherein said organizing data into said network comprises organizing data into said network including a plurality of predecessor groups, wherein at least one of said plurality of predecessor groups is a descendant group with respect to another one of said plurality of predecessor groups, and wherein at least one of said plurality of predecessor groups is a parent group having no other predecessor groups and only descendant groups;

wherein said traversing said network from said occurrence in said one of said plurality of descendant groups to related data in said at least one predecessor group comprises traversing said network from said occurrence in said one of said plurality of descendant groups to parent related data in said parent group;

wherein said traversing said network from said related data in said at least one predecessor group to a plurality of second related data in said plurality of descendant groups comprises traversing said network from said parent related data in said parent group to a plurality of third related data in said plurality of descendant groups using said relationships among the data, said plurality of third related data corresponding to each instance of data in said plurality of descendant groups that is related to said parent related data; and wherein said building said context comprises building a context including said occurrence, said parent related data, and said plurality of third related data.

* * * * *